United States Patent
McBeath et al.

(10) Patent No.: US 8,891,378 B2
(45) Date of Patent: Nov. 18, 2014

(54) METHOD AND SYSTEM FOR HYBRID AUTOMATIC REPEAT REQUEST OPERATION FOR UPLINK COORDINATED MULTI-POINT SIGNALING

(75) Inventors: Sean McBeath, Irving, TX (US); Mo-Han Fong, Kanata (CA); Sophie Vrzic, Kanata (CA); Mark Earnshaw, Kanata (CA); Robert Novak, Kanata (CA); Zhijun Cai, Irving, TX (US); Hua Xu, Kanata (CA); Youn Hyoung Heo, Waterloo (CA)

(73) Assignee: Blackberry Limited, Waterloo (CA)

( * ) Notice: Subject to any disclaimer, the term of this patent is extended or adjusted under 35 U.S.C. 154(b) by 118 days.

(21) Appl. No.: 13/395,863

(22) PCT Filed: Sep. 17, 2010

(86) PCT No.: PCT/US2010/049259
§ 371 (c)(1),
(2), (4) Date: Mar. 13, 2012

(87) PCT Pub. No.: WO2011/035109
PCT Pub. Date: Mar. 24, 2011

(65) Prior Publication Data
US 2012/0176887 A1 Jul. 12, 2012

Related U.S. Application Data

(60) Provisional application No. 61/243,795, filed on Sep. 18, 2009.

(51) Int. Cl.
*H04L 12/26* (2006.01)
*H04L 1/18* (2006.01)
*H04L 1/00* (2006.01)

(52) U.S. Cl.
CPC ............ *H04L 1/1822* (2013.01); *H04L 1/1854* (2013.01); *H04L 2001/0093* (2013.01); *H04L 1/1887* (2013.01)
USPC .......................................... 370/236; 370/328

(58) Field of Classification Search
CPC .... H04L 1/1822; H04L 1/1825; H04L 1/1854
USPC .................. 370/236, 746, 216, 328, 370, 315
See application file for complete search history.

(56) References Cited

U.S. PATENT DOCUMENTS

2003/0147348 A1   8/2003   Jiang
2003/0152031 A1   8/2003   Toskala et al.
(Continued)

FOREIGN PATENT DOCUMENTS

EP   1507421 A1   2/2005
WO   2008024340 A2   2/2008
WO   2009034553 A2   3/2009

OTHER PUBLICATIONS

Invitation to pay additional fees and, where applicable, protest fee mailed Jan. 26, 2011. In corresponding application No. PCT/US2010/049259.
(Continued)

*Primary Examiner* — Albert T Chou
(74) *Attorney, Agent, or Firm* — Novak Druce Connolly Bove + Quigg LLP

(57) ABSTRACT

A method and system for hybrid automatic repeat request operation for uplink coordinated multi-point signaling, the method in one embodiment sending a data packet from a user equipment to a plurality of network elements; waiting for a control indication from at least one of the plurality of network element; and retransmitting the data packet to the plurality of network elements if the control indication specifies retransmission is required.

21 Claims, 19 Drawing Sheets

(56) References Cited

U.S. PATENT DOCUMENTS

| | | |
|---|---|---|
| 2006/0046733 A1 | 3/2006 | Fauconnier et al. |
| 2007/0189282 A1* | 8/2007 | Lohr et al. .................... 370/370 |
| 2010/0050039 A1* | 2/2010 | Zhang et al. .................. 714/749 |
| 2010/0260151 A1* | 10/2010 | Onggosanusi et al. ....... 370/336 |
| 2011/0211522 A1* | 9/2011 | Chung et al. .................. 370/315 |
| 2012/0087273 A1* | 4/2012 | Koo et al. ..................... 370/252 |
| 2012/0147815 A1* | 6/2012 | Meyer et al. .................. 370/328 |

OTHER PUBLICATIONS

The International Search Report and Written Opinion of the International Searching Authority, or Declaration mailed May 20, 2011. In corresponding application No. PCT/US2010/049259.

Canadian Office Action mailed Nov. 18, 2013, in Canadian patent application No. 2,773,568.

* cited by examiner

METHOD AND SYSTEM FOR HYBRID AUTOMATIC REPEAT REQUEST OPERATION FOR UPLINK COORDINATED MULTI-POINT SIGNALING

CROSS-REFERENCE TO RELATED APPLICATIONS

This application is a national phase application of international application no. PCT/US2010/049259, filed Sep. 17, 2010, which claims priority to U.S. Provisional Application No. 61/243,795 filed Sep. 18, 2009, both of which are incorporated by reference herein in their entireties.

FIELD OF THE DISCLOSURE

The present disclosure relates to coordinated multi-point (COMP) transmission and reception and in particular to hybrid automatic repeat request signaling in coordinated multi-point transmission and reception.

BACKGROUND

Coordinated multi-point transmission and reception for mobile networks involves communication with a single mobile device or user equipment (UE) from a plurality of network elements. A network element may be a base station, an Evolved Universal Terrestrial Radio Access Network (E-UTRAN) node B (eNB), a cell within an eNB or other types of network node. For example, in Long Term Evolution-Advanced (LTE-A), coordinated multi-point transmission and reception will be supported. For uplink transmission, when the UE sends packets to both a first and a second network element, if either network element correctly receives the packet from the UE, then the packet is considered to be successfully received.

In Hybrid Automatic Repeat Request (HARQ) systems, the UE transmits one HARQ transmission in a time period, and upon receiving a negative acknowledgement from a network element, the UE transmits a second or subsequent HARQ transmission in a subsequent time period.

When two network elements related to the base stations receive a packet, they each attempt to decode the packet. However, in order for the network elements to properly coordinate, the packet status needs to be communicated between the two network elements. This handshaking occurs over a backhaul link and in order for the uplink coordinated multi-point transmissions to properly operate, the handshaking on the backhaul link must occur. Under current HARQ systems, the time required for this backhaul link signaling may be insufficient to properly coordinate the network elements.

BRIEF DESCRIPTION OF THE DRAWINGS

The present application will be better understood with reference to the drawings, in which.

DETAILED DESCRIPTION OF THE DRAWINGS

The present disclosure is provided below with regard to Long Term Evolution (LTE) and Long Term Evolution-Advanced (LTE-A) systems. However, this is not meant to be limiting to the present disclosure, and the use of LTE and LTE-A are merely exemplary. The methods and systems provided herein could easily be used with other coordinated multi-point transmission and reception systems.

The present disclosure is provided below with regard to coordinated multi-point transmission and reception involving multiple Evolved-Universal Terrestrial Radio Access Network (e-UTRAN) Node B (eNB). However, this is not meant to be limiting to the present disclosure, and the use of eNB is merely exemplary. The methods and systems provided herein could easily be used with other types of network element, such as a base station, a cell within an eNB or other types of network nodes.

Figure 1:
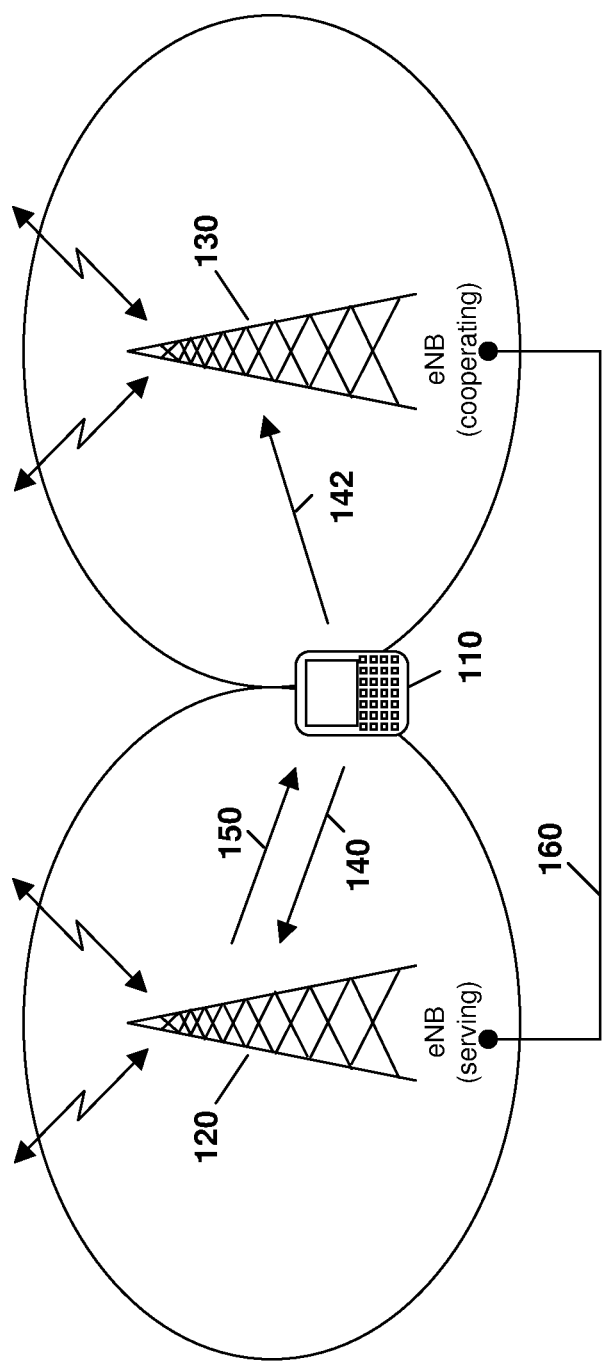
FIG. 1 is a block diagram showing an exemplary coordinated multi-point communication between a user equipment and network element.

Referring to FIG. 1, FIG. 1 illustrates a block diagram of an exemplary coordinated multi-point transmission system. In FIG. 1, a user equipment (UE) 110 communicates with an Evolved-Universal Terrestrial Radio Access Network (e-UTRAN) Node B (eNB) 120. In the example of FIG. 1, eNB 120 is the serving eNB.

UE 110 further communicates with a second eNB 130, which, in the example of FIG. 1, is a cooperating eNB.

As seen in FIG. 1, data is sent from UE 110 to both eNB 120 and eNB 130. This is depicted through arrows 140 and 142. Further, in the example of FIG. 1, control information is received from eNB 120 as seen by arrow 150. However, this is not meant to be limiting and in some situations data or control could also be received from eNB 130.

Utilizing the example of FIG. 1, if UE 110 needs to send a data packet then both eNB 120 and eNB 130 attempt to receive this data packet. If either eNB 120 or eNB 130 successfully receives and decodes the packet, then the packet is considered to be successfully received.

The coordination of eNB 120 and eNB 130 is done over a backhaul link, illustrated by link 160 in FIG. 1. This link may be implemented in several ways including optical, wired and wireless connections.

Figure 2:
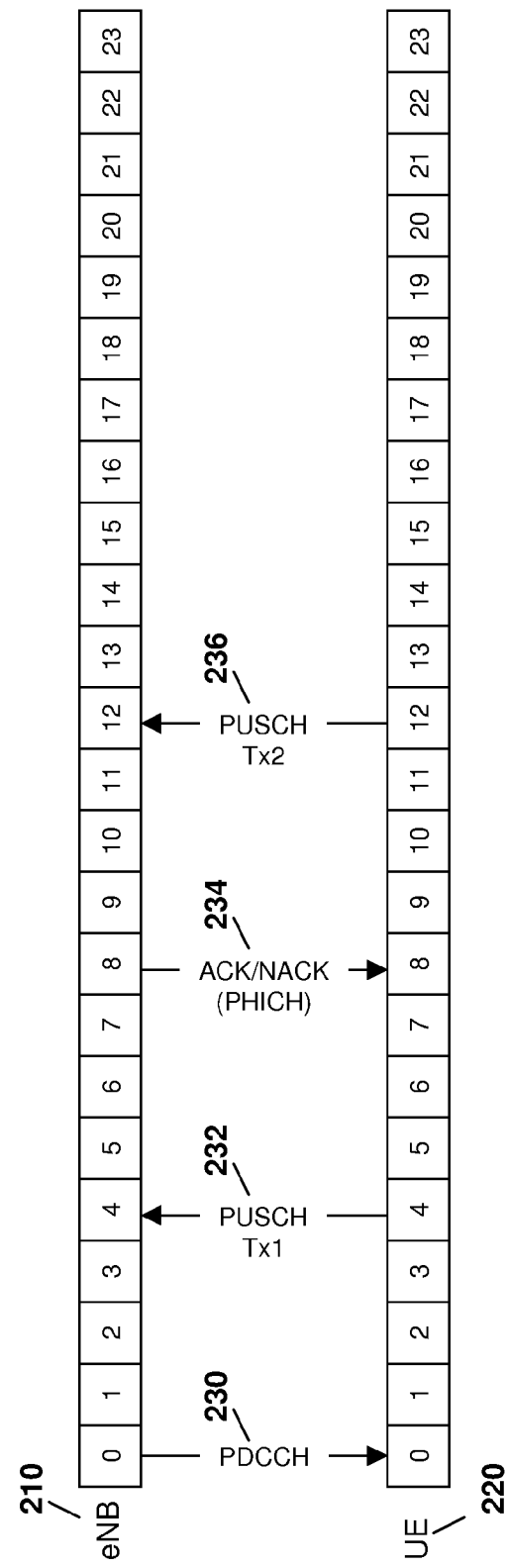
FIG. 2 is a timing diagram illustrating Long Term Evolution Release-8 HARQ timing.

Reference is now made to FIG. 2, which shows a LTE Release-8 HARQ Timing diagram. In FIG. 2, eNB 210 communicates with UE 220.

As seen in FIG. 2, in subframe 0 the eNB transmits control information over the Physical Downlink Control Channel (PDCCH) as shown by arrow 230. In subframe 4, the UE 220 transmits HARQ transmission 1 (initial transmission) via the Physical Uplink Shared Channel (PUSCH), as shown by arrow 232.

If the eNB is able to decode HARQ transmission 1, it transmits an Acknowledgment (ACK) in subframe 8, as shown by message 234. Conversely, if the eNB is unable to decode HARQ transmission 1, it transmits a Negative Acknowledgment (NACK) as message 234 in subframe 8.

If the UE receives a NACK in subframe 8, it transmits HARQ transmission 2 (retransmission) in subframe 12, as shown by arrow 236.

As will be appreciated by those skilled in the art, the single eNB 210 in FIG. 2 allows for the above timing. Based on the above, the HARQ signaling requires the transmission of information every 4 subframes, which results in approximately 4 milliseconds to evaluate the received information, determine whether an ACK or a NACK should be sent, and prepare the ACK or NACK for transmission. However, when two eNBs are used for CoMP, generally 4 milliseconds is not enough time to coordinate between the eNBs over a backhaul link. In practice, 12-20 milliseconds is a more reasonable estimate for such operations.

In order to allow for coordinated multi-point communication, and in particular to the hybrid automatic repeat request in the coordinated multi-point transmissions, various methods are provided herein.

Asynchronous HARQ for Uplink CoMP

Figure 3:
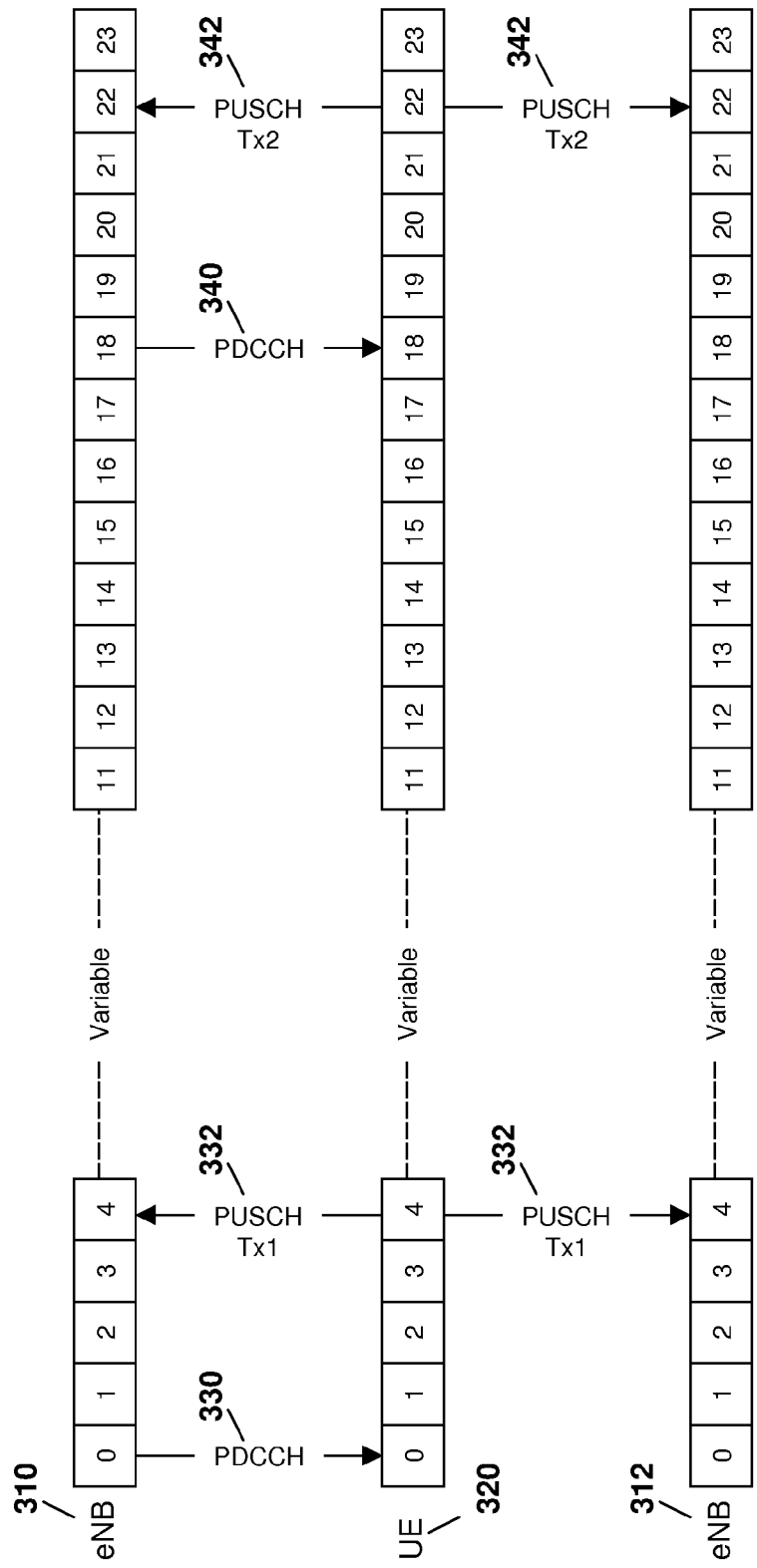
FIG. 3 is a timing diagram illustrating asynchronous HARQ timing for UL CoMP.

In a first embodiment, uplink HARQ uses an asynchronous mode of operation. Reference is now made to FIG. 3.

In the embodiment of FIG. 3, a control indication is sent via the control channel between eNB 310 and UE 320, as shown by arrow 330. This is done in subframe 0.

In subframe 4, UE 320 transmits HARQ transmission 1 via the PUSCH, as shown by arrows 332. The transmission is received by both a first eNB 310 and a second eNB 312, and both attempt to decode it.

Between subframe 4 and subframe n, where n is variable, eNB 310 and eNB 312 communicate the ACK/NACK status and potentially new scheduling information via a backhaul link. In the embodiment of FIG. 3, n is 14 subframes. However, this is not meant to be limiting and other values of n could be used or configured, either statically or dynamically.

In the example of FIG. 3, eNB 310 is the serving eNB. Once coordination occurs between eNB 310 and eNB 312, then eNB 310 sends a new data indicator as part of a control channel transmission shown by arrow 340.

In response to the receipt of the new data indicator, the value of which indicates a retransmission (i.e. not toggled in LTE Rel-8) in the control message of 340, UE 320 sends HARQ transmission 2 to both eNBs in subframe n+4, which in the example of FIG. 3 is subframe 22 as shown by arrows 342.

As will be appreciated, the new data indicator in the message of arrow 340 may or may not order the retransmission in subframe n+4. If HARQ transmission 1 (arrow 332) was successfully received then HARQ transmission 2 (arrow 342) will contain new data rather than a retransmission.

Figure 4:
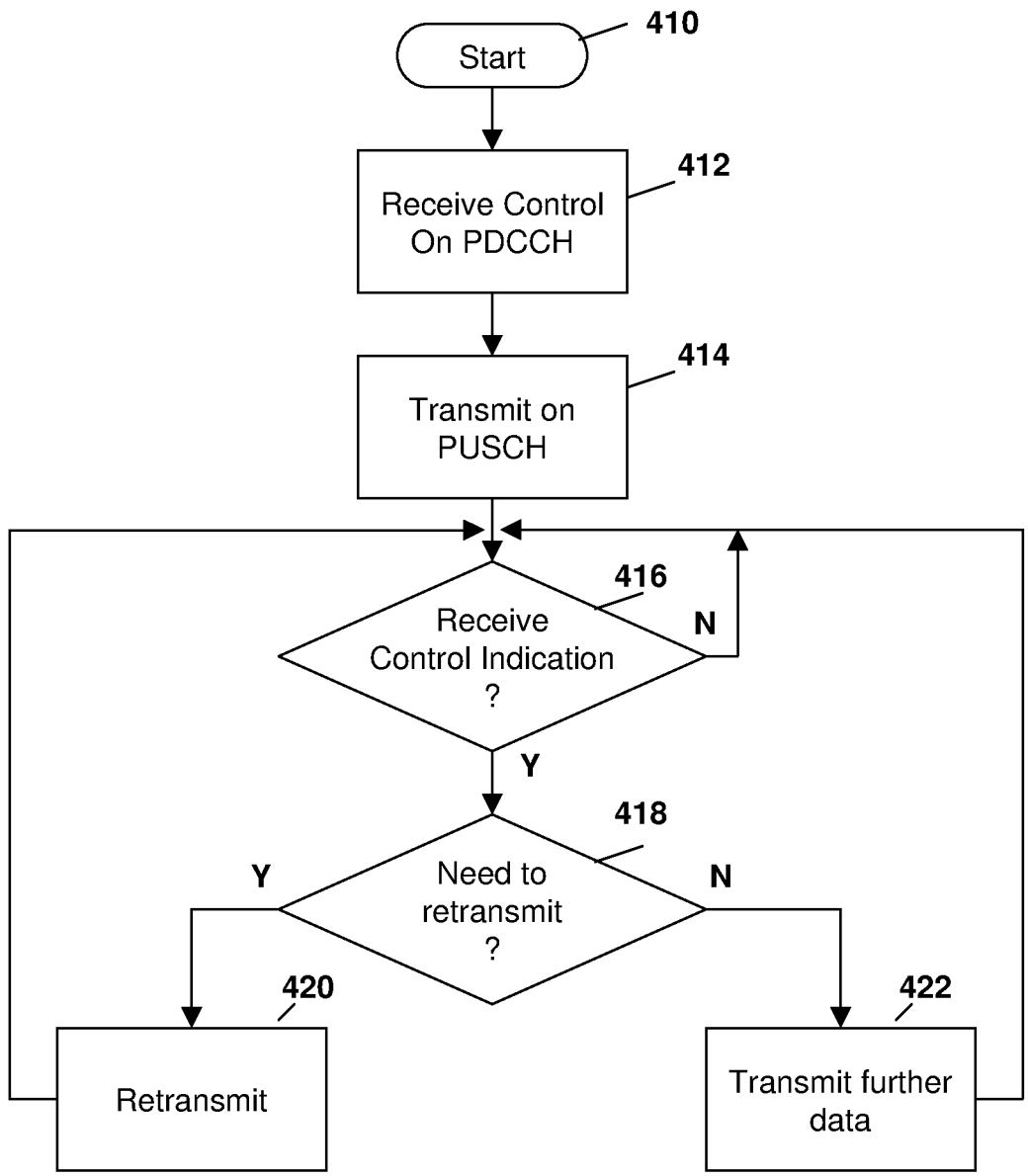
FIG. 4 is a flow diagram of a procedure on a UE for asynchronous HARQ timing for UL CoMP.

The solution above is illustrated with regard to FIG. 4 from a UE perspective.

The procedure of FIG. 4 starts at block 410 and proceeds to block 412 in which the UE receives a data or control transmission on the PDCCH.

Responsive to the receipt of the control indication on the PDCCH, the procedure proceeds to block 414 in which a first transmission is transmitted on the PUSCH.

The procedure then proceeds to block 416 in which the UE waits to receive a control indication. As will be appreciated, the check in block 416 determines whether or not a data indicator has been received. For example, the control indicator is included in the message as shown by arrow 340 in FIG. 3.

If no control indication has been received, the procedure proceeds back to block 416 and continues to wait for a control indication.

Once a control indication has been received at block 416, the procedure proceeds to block 418 in which a check is made to determine whether the new data indicator indicates that the transmission should be retransmitted. If yes, the procedure proceeds to block 420 in which retransmission occurs and if no, the procedure proceeds to block 422 in which a transmission of a further data packet may be started.

From either block 420 or from block 422, the procedure proceeds back to block 416 to wait for a control indication.

As will be appreciated, the solution in the above embodiment requires that an HARQ process index needs to be added to Downlink Control Information (DCI) format 0 (or equivalently a new DCI format) to allow for the coordination of HARQ processes. Also, the eNB needs to transmit more physical downlink control channel messages, which may involve an increase in control channel overhead. However, the above allows for variable backhaul timing. Thus, if the backhaul is heavily used, the timing may vary and the above solution accommodates this.

Also, a Physical Hybrid HARQ Indicator Channel (PH-ICH) may not be necessary with the above solution. The PHICH is used to signal HARQ ACK/NACK information from the eNB to the UE in LTE Rel-8.

Figure 5:
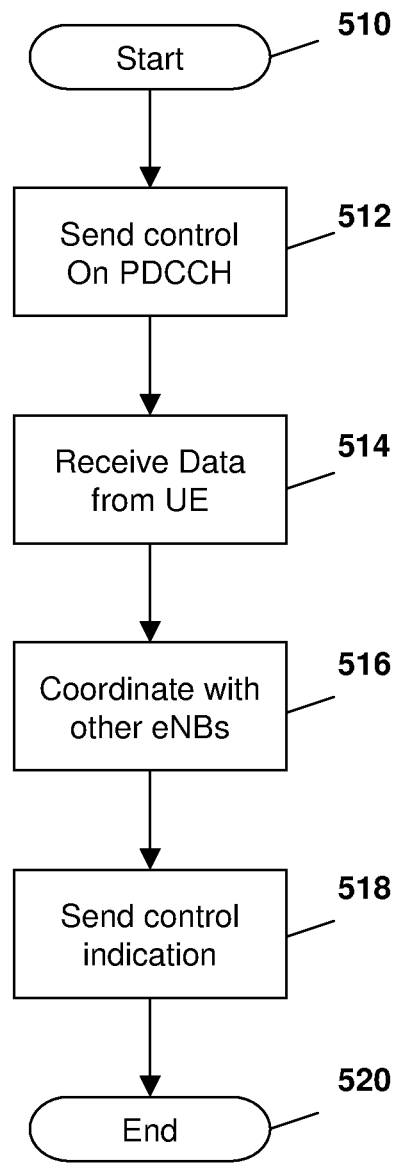
FIG. 5 is a flow diagram of a procedure on a network element for asynchronous HARQ timing for UL CoMP.

Reference is now made to FIG. 5. FIG. 5 shows the embodiments above with regard to the eNB. The procedure of FIG. 5 starts at block 510 and proceeds to block 512 in which a control indicator is sent on the physical downlink control channel.

At a subsequent time, data is received from a UE, as shown by block 514.

The receipt of data from the UE in block 514 requires the coordination with any other eNB, which is depicted in block 516.

Upon coordination, as shown by block 516, a control indication is sent to the UE on the PDCCH in block 518. As will be appreciated, the control indication indicates that retransmission is necessary if all eNBs, after coordinating, have discovered that they were unsuccessful in decoding the data.

From block 518, the procedure proceeds to block 520 and ends.

Synchronous HARQ for UL CoMP

Figure 6:
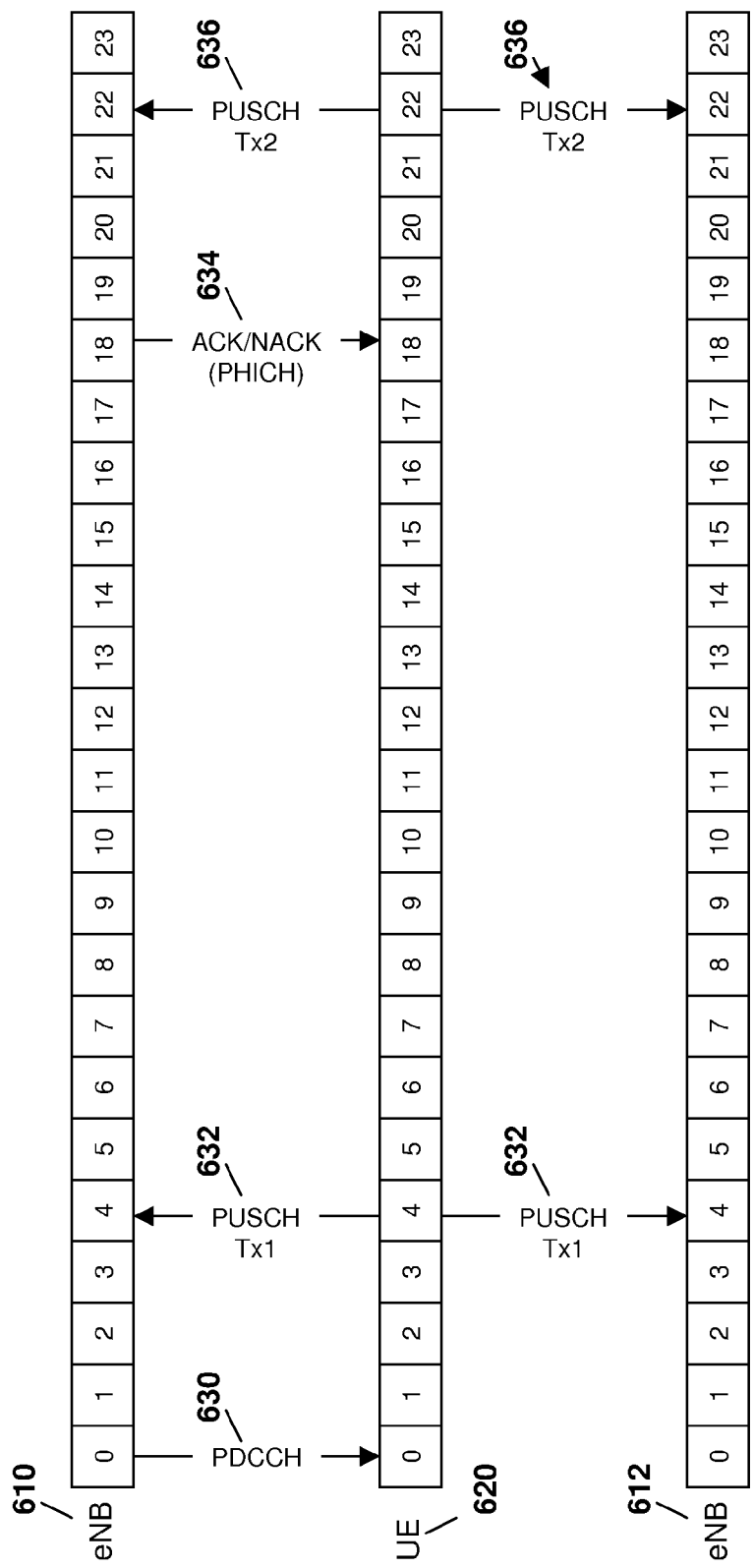
FIG. 6 is a timing diagram illustrating synchronous HARQ timing for UL CoMP.

In a further embodiment, HARQ timing may be extended in a synchronous HARQ timing model. Reference is now made to FIG. 6.

In the embodiment of FIG. 6, both serving eNB 610 and cooperating eNB 612 communicate with UE 620. In subframe 0, serving eNB 610 transmits the PDCCH (control). Thereafter, the UE transmits, in subframe 4, HARQ transmission 1, as shown by arrows 632 via the PUSCH to both the serving eNB 610 and to cooperating eNB 612. Both serving eNB 610 and cooperating eNB 612 receive HARQ transmission 1 and attempt to decode it. Between subframe 4 and subframe c, where c is a fixed constant that is specified numerically or may be configured semi-statically via higher layer signaling, serving eNB 610 and cooperating eNB 612 communicate the ACK/NACK status and potentially new scheduling information via the backhaul link.

At subframe c an ACK or NACK is sent via the PHICH to UE 620, as shown by message 634. If UE 620 receives a NACK at subframe c, then the UE transmits HARQ transmission 2, as shown by arrow 636, in subframe c+4.

In the example of FIG. 6, c is designated as 18 and thus a retransmission would occur at subframe 22 based on a NACK received at subframe 18. This is not meant to be limiting, and other values of c are possible.

As will be appreciated by those in the art, in some embodiments the relative timing of HARQ transmission 2 may be a multiple of LTE Rel-8 timing. For example, HARQ transmission 2 could occur 24 subframes after HARQ transmission 1.

Further, if the relative timing of HARQ transmission 2 is 16, this would facilitate the coordination of different UEs in the same HARQ process without additional signaling.

Figure 7:
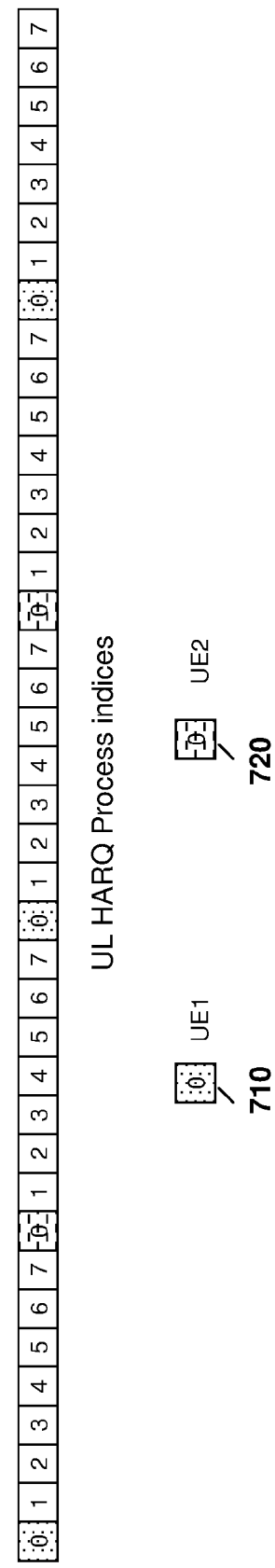
FIG. 7 is a block diagram illustrating HARQ process indices for coordinated UEs.

Reference is now made to FIG. 7. FIG. 7 shows the LTE timing for the UL synchronous CoMP with multiple UEs.

In particular, the uplink process indices are shown, where the transmission by various UEs occur at specific indices. A first UE 710 may communicate at index 0. A second UE 720 could communicate eight subframes later. The first UE could then communicate eight subframes after that and so on. The advantage of this is that the coordination for different UEs could be done without the use of additional signaling.

From the above embodiments, the PDCCH overhead is consistent with LTE Rel-8 since there is only the first PDCCH message 630 from FIG. 6 and additional PDCCH signaling such as that described above with regard to FIG. 3 is not necessary.

Furthermore, no changes are needed to DCI format 0.

In a further embodiment, as will be appreciated by those in the art, the backhaul link may not be able to be tightly controlled, which may require the synchronous timing to be flexible. The timing would either have to be over-provisioned for the worst case scenario for the backhaul link, or the eNB may be able to change the synchronous HARQ timing due to backhaul loading. Such changes to synchronous timing may be done through Radio Resource Control (RRC) signaling, for example.

Figure 8:
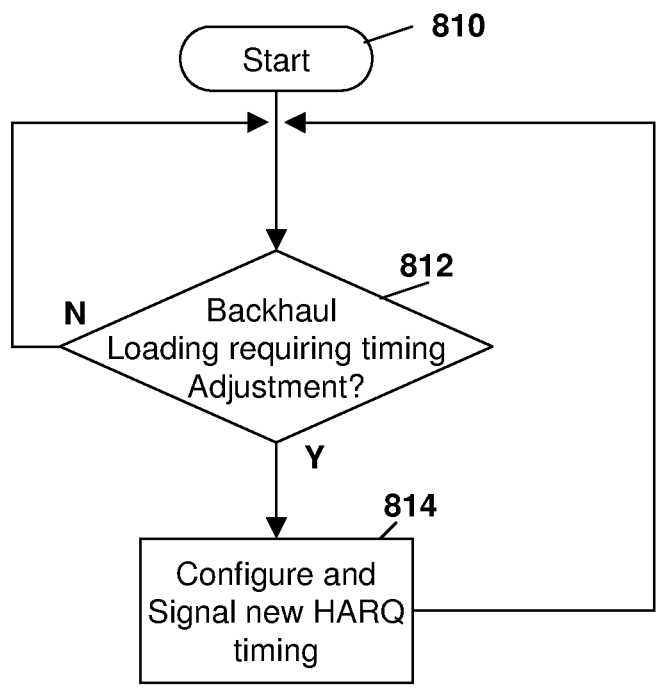
FIG. 8 is a flow diagram of a procedure on a network element for provisioning synchronous HARQ timing for UL CoMP.

Reference is now made to FIG. 8. FIG. 8 shows a flow diagram for the reconfiguration of the HARQ timing. In particular, the procedure of FIG. 8 starts at block 810 and proceeds to block 812 in which a check is made to determine whether the backhaul loading requires a timing adjustment. As will be appreciated by those in the art, backhaul loading may allow for timing adjustments to either increase or decrease the HARQ timing depending on the loading levels. For example, in block 812, a check could be made to determine whether backhaul loading is greater than a predetermined threshold, in which case the HARQ timing may need to be increased. Conversely, if the HARQ timing has been increased in the past, once the backhaul loading falls below a predetermined threshold then the HARQ timing may be decreased.

In other embodiments, the HARQ timing may be dependent on various levels of backhaul loading. Thus, more than 2 HARQ timing options may exist. For example, if there is very little loading the HARQ timing may be a first timing level, if there is moderate backhaul loading then the HARQ timing may be increased slightly and if there is heavy backhaul loading then the HARQ timing may be increased even more. The present disclosure is not meant to be limited to two or three timing levels.

From block 812, if the check determines that the backhaul loading level requires an adjustment in the timing then the procedure proceeds to block 814 in which the new HARQ timing is both configured on the eNB and signaled to a UE. Furthermore, in some embodiments, the signaling may also occur on the backhaul between the serving eNB and the cooperating eNB to ensure both eNBs have the same synchronous timing.

From block 814, the procedure proceeds back to block 812 to continue checking whether the backhaul loading level requires a timing adjustment.

As will be appreciated by those in the art, the PHICH region for uplink CoMP UEs may collide with non-CoMP UEs. In this regard, a distinct PHICH region may be needed for uplink CoMP UEs. Alternatively, the eNB could allocate different demodulation reference signal cyclic shift values for uplink CoMP UEs to avoid collisions.

The use of extended synchronous timing in which the transmissions are extended could result in the number of HARQ processes increasing. Specifically, for Rel-8 signalling, there are effectively 8 HARQ processes in the uplink. With reference to FIG. 6 above, c HARQ processes are required. In the example of FIG. 6, therefore 18 HARQ processes are required. For example, to utilize the entire time domain, unique HARQ processes would be needed for each of subframes 4 to 21. However, since HARQ process identifiers are not signaled explicitly in the uplink and the soft buffer is located in the eNB, it may not be a problem to increase the number of HARQ processes.

Extend Synchronous HARQ Timing using Existing UL HARQ Design

A further alternative embodiment enforces constraints on UL scheduling at the eNB such that the periodicity of HARQ process usage for a particular HARQ process is extended. In one embodiment, this extension may be to a multiple of the current 8 millisecond UL synchronous HARQ periodicity. The extension permits existing UE structures to be reused with no modification required by extending the UL HARQ period, which could be thought of as an effective round trip time. Thus, additional time for UL CoMP backhaul communications and combining is made available.

Figure 9:
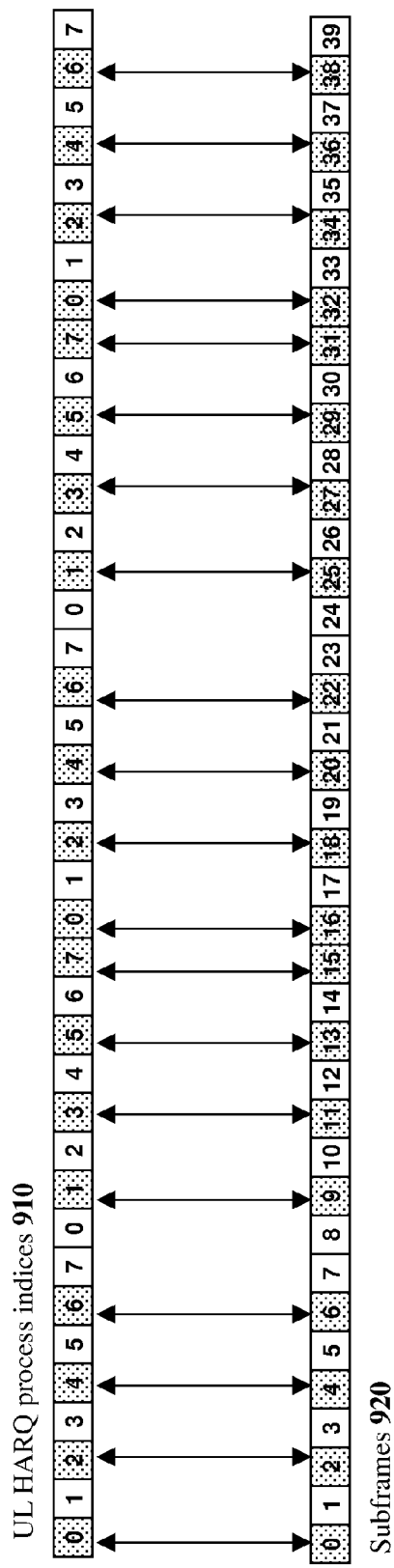
FIG. 9 is a timing diagram illustrating extended synchronous HARQ timing for UL CoMP using a multiple of 2.

Reference is now made to FIG. 9. FIG. 9 shows UL HARQ process indices 910 associated with specific subframes 920. In the example of FIG. 9, 8 UL HARQ processes exist as labeled on the top of the diagram. These HARQ processes repeat in a synchronous cycle length of 8 milliseconds.

Sample subframe numbers are shown in subframes 920.

Arrows between UL processes 910 and subframes 920 show a linkage between the specific HARQ process that is used in a particular subframe. PUSCH transmissions or retransmissions from a particular UE are only permitted in the shaded subframes. Further, as can be seen, each UL HARQ process is only used once within each 16 millisecond period, and PUSCH transmissions generally occur only every second subframe in a series of subframes. Thus, for example, UL HARQ process 0 is transmitted in subframe 0 and is next transmitted in subframe 16. Furthermore, UL HARQ process 1 is not transmitted until subframe 9, thus leaving subframe 1 empty.

The result of the above is the reduction of the maximum achievable peak data rate by the UE by half. Further, extended UL HARQ periods may result in greater latency being introduced by the wireless link component of the system. However, the regular spacing of possible transmission opportunities (assuming UL grants are provided by the eNB) allows for any new packets that arrive at the UE's Layer 2 sublayers to be potentially transmitted with minimal delay.

The eNB will always need to signal an ACK on the PHICH for each PUSCH transmission by the UE since non-adaptive retransmissions (which are triggered by a NACK being sent on the PHICH) will not be possible. Any required HARQ retransmissions may need to be adaptive and commanded by a DCI message (e.g. DCI 0) on the PDCCH.

Figure 10:
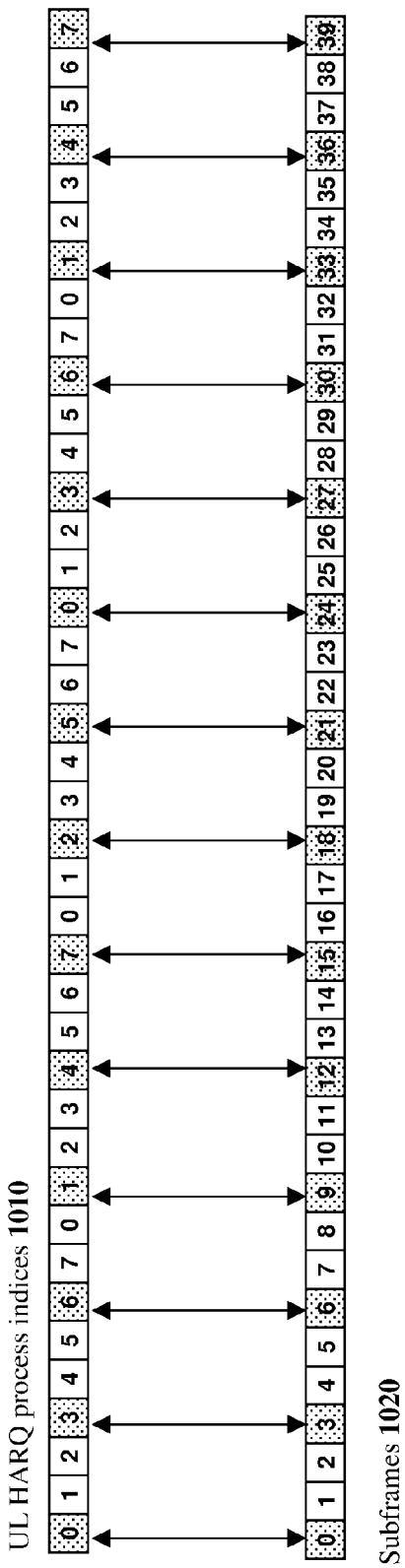
FIG. 10 is a timing diagram illustrating extended synchronous HARQ timing for UL CoMP using a multiple of 3.

Referring to FIG. 10, this figure shows a similar example as that of FIG. 9, with a 24 millisecond UL HARQ period. In FIG. 10, PUSCH transmissions or retransmissions occur every third subframe in a series of subframes and hence the maximum achievable peak rate by the UE will be reduced to one-third of the normal value. Thus, in FIG. 10, UL HARQ process indices 1010 are linked to subframes 1020. As can be seen, HARQ process 0 is sent on subframe 0 and subframe 24. Further, there are 2 unused (by the UE) subframes between the transmission UL process indices 0 and UL process indices 3.

Figure 11:
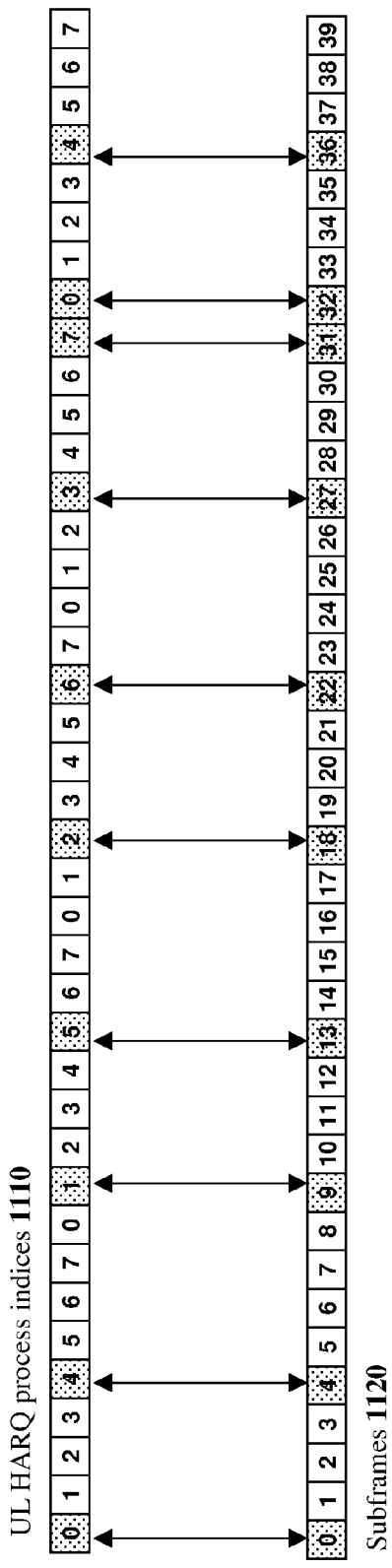
FIG. 11 is a timing diagram illustrating extended synchronous HARQ timing for UL CoMP using a multiple of 4.

Further, referring to FIG. 11, FIG. 11 shows a similar example for a 32 millisecond UL HARQ period, which will allow a significant margin to account for backhaul delays for inter-eNB communications. Here, PUSCH transmissions or retransmissions occur on average, every 4 subframes in a series of subframes. However, the maximum achievable peak data rate by the UE will be reduced to one-quarter of the normal value.

Thus, in FIG. 11, UL HARQ process 1110 is linked with subframes 1112. Further, UL HARQ process 0 is sent on subframe 0 and on subframe 32 as shown in FIG. 11.

In the examples of FIGS. 9, 10, 11 above, a UE being scheduled with an approach such as those present would not be transmitting the PUSCH every subframe. However, different UL CoMP UEs could be assigned different starting points for their UL HARQ period. Such assignment could occur semi-statically via higher layer signaling, or based on some UE identification parameter such as the International Mobile Subscriber Identity (IMSI) or Cell Radio Network Temporary Identifier (C-RNTI). With multiple UEs within each cell, usage of the UL resources would be maintained at an approximate equal level for each subframe, rather than having sudden peaks every several subframes. In addition, different UEs within the same cell could be configured to have UL HARQ periods of different lengths depending upon their individual requirements. Thus, a UE with a small amount of traffic might be able to handle an UL period of 32 milliseconds, whereas an UE requiring a higher data rate may be configured with an UL period of 16 milliseconds. In such a situation, backhaul transmissions between cooperating eNBs may be prioritized for UEs with shorter UL HARQ periods to ensure that scheduling deadlines can be met.

With a longer UL HARQ period, the number of UL transmission attempts may need to be increased in any radio resource configuration provided by the eNB to the UE. This quantity may be the maxHARQ-Tx field in the MAC-MainConfig information element in Section 6.3.2 of the Third Generation Partnership Project (TGPP) Technical Specification (TS) 36.331, the contents of which are incorporated herein by reference.

This quantity provides the maximum number of transmission attempts for UL HARQ, with each transmission attempt occurring every 8 milliseconds. However, if the UL HARQ period is increased, then the effective maximum number of transmission attempts would have to be appropriately scaled from the value provided by the maxHARQ-Tx. For example, if maxHARQ-Tx has a value of 24, but the UL HARQ period is increased to 16 milliseconds, then the effective maximum number of UL HARQ transmission attempts would be 24 divided by 2 or 12 transmission attempts. Parameter scaling would be performed at the eNB in one embodiment. In this case, no changes would be required to existing UE designs. For example, if the eNB wished a particular UE to have an effective maximum of UL HARQ transmission attempts equal to 8 and the UL HARQ period was 24 milliseconds then the eNB would configure the UE with maxHARQ-Tx equal to 24.

As will be appreciated by those skilled in the art, the approaches of FIGS. 9, 10 and 11, maintain existing UL HARQ designs for UEs and could therefore be used with LTE Release 8 (Rel-8) UEs. Further, different configurations may be used to achieve different UL HARQ periods depending on local eNB backhaul delays.

The approach of FIGS. 9, 10 and 11 also require minimal changes to technical specifications and the only changes may be a change to the eNB scheduling algorithm.

As will be appreciated by those in the art, the approach of FIGS. 9, 10 and 11 may also be utilized with other approaches described herein. Furthermore, different UEs may be configured using different approaches which may be useful for facilitating backward compatibility with Rel-8 UEs since those UEs can use the above solution while later release UEs could be configured to use other solutions presented herein.

As will be appreciated by those skilled in the art, there would be no impact in overall cell capacity and cell throughput for the particular cell utilizing the solutions of FIGS. 9, 10, 11. However, as indicated above, the peak achievable data rate for a given UE would be reduced. Further, as indicated above, non-adaptive retransmissions are not possible so there would be a potential increase of signaling of DCI 0 on the PDCCH.

Support for Rel-8 UEs

The above may be extended to support CoMP within the context of Long Term Evolution (LTE) Rel-8 HARQ protocol. In this case, the UE may not be aware of any cooperating eNBs.

For the situation in which the UE is not aware of any cooperating eNBs, the serving eNB uses the ACK/NACK status from a cooperating eNB as it becomes available. As will be appreciated by those in the art, such a scheme may result in some radio resources being wasted, since the cooperating eNB may decode a packet while a serving eNB may allocate additional resources for retransmissions.

Mixed Support of Synchronous and Asynchronous HARQ

In some embodiments, operating in both synchronous and asynchronous HARQ may be possible, where synchronous HARQ is set according to Rel-8 timing. In these embodiments, the eNB can configure a UE to use either HARQ or asynchronous HARQ depending on whether it will be using CoMP, relay or some other transmission technique to serve the UE.

For UEs configured to use asynchronous HARQ, the UE will decode the PDCCH with a new transmission format, such that it searches for new DCI formats, i.e., via the blind decoding process. For example, a new DCI format can be defined as DCI format OA. This new DCI format may have additional bits to indicate the HARQ process.

UE Assisted Coordination

In a further embodiment, the UE may assist the coordination of the serving and cooperating eNB. This may be done by both the serving eNB and cooperating eNB transmitting an ACK or a NACK to the UE.

In one embodiment, each eNB transmits its ACK/NACK on its cell-specific PHICH resource located in the first Orthogonal Frequency Division Multiplexing (OFDM) symbol of the subframe. Cell-specific scrambling is used for the PHICH. The PHICH index used by each eNB corresponds to the UL resource block (RB) location on the PUSCH transmitted by the UE. The UE could try to decode the PHICH from the serving eNB first. If the decoded data is an ACK, the UE does not need to decode the PHICH channel from the other cooperating eNBs. If the UE receives a NACK from the serving eNB, it could continue decoding the PHICH from other cooperating eNBs until an ACK is received. If the UE fails to receive an ACK from all PHICH channels from cooperating eNBs, a retransmission may be started.

Figure 12:
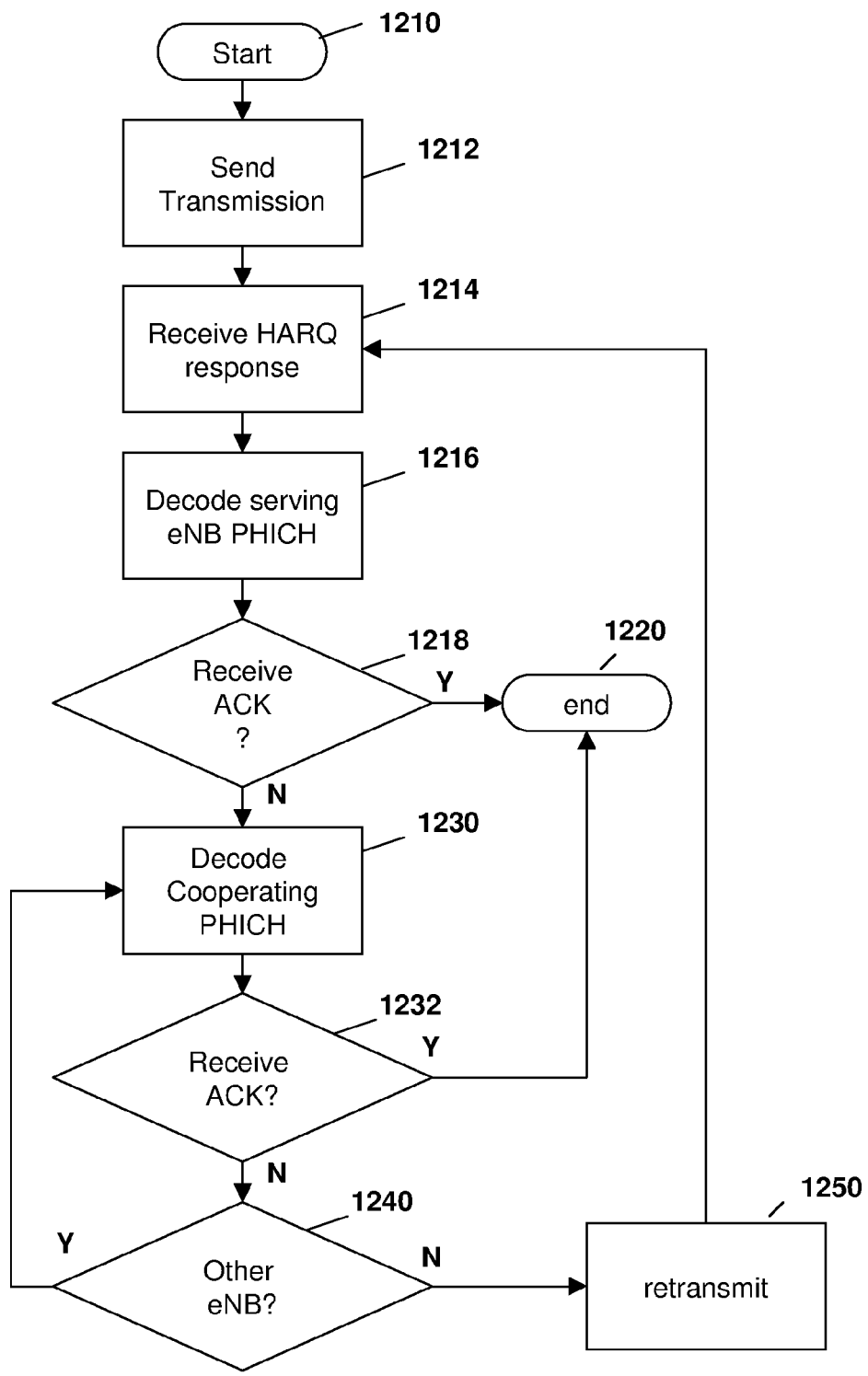
FIG. 12 is a flow diagram of a procedure on a UE for decoding HARQ responses.

Reference is now made to FIG. 12. The procedure of FIG. 12 starts at block 1210 and proceeds to block 1212 in which a transmission is sent from the UE to the eNBs.

In response to the transmission of block 1212, the procedure proceeds to block 1214 in which HARQ responses are received.

From block 1214, the procedure proceeds to block 1216 in which the PHICH of the serving eNB is decoded. In block 1218, a check is made to determine whether or not the HARQ response of the serving eNB is an ACK. If yes, the procedure proceeds to block 1220 and ends. Otherwise, the procedure proceeds to block 1230 and decodes the HARQ response from the cooperating eNB PHICH. From block 1230, the procedure proceeds to block 1232 in which a check is made to determine whether or not the HARQ response is an ACK.

If the response is an ACK, the procedure proceeds from block 1232 to block 1220 and ends. Otherwise, the procedure proceeds to block 1240 to check whether or not other cooperating eNBs are being utilized. As will be appreciated by those in the art, CoMP may include 2 or more eNBs. If there are more eNBs, the procedure proceeds to block 1230 and decodes the PHICH for the next cooperating eNB.

From block 1240 if no other cooperating eNBs exist, the procedure proceeds to block 1250 in which the transmission is retransmitted and the procedure then proceeds back to block 1214 to check the HARQ responses.

In a further embodiment, each eNB transmits its ACK/NACK on a specific control channel region defined for DL CoMP. Within the specific control region, separate PHICH space is reserved for each eNB. The PHICH index used by each eNB within its reserved PHICH space corresponds to the UL resource block location on the PUSCH transmitted by the UE. A CoMP specific ID is used for scrambling of the PHICH.

In yet a further embodiment, each eNB transmits its ACK/NACK on the same resource within the DL CoMP region. The transmissions from the cooperating nodes are superimposed on the same resources corresponding to the location of the assigned UL transmission. The UE retransmits only when both eNBs send a NACK. This can be considered as a four state ACK, where 2 bits are used for the ACK/NACK. Each eNB could use the same transmit diversity scheme for its ACK/NACK. For example, each eNB could use 2-tx SFBC (space-frequency block code) as transmit diversity, and therefore, for the UE, a double STBC (space-time block code) receiver needs to be used for receiving such ACK/NACKs from each eNB.

In a further embodiment, each eNB could transmit its ACK/NACK during different repetitions of PHICH channels. For example, the serving eNB could transmit its ACK/NACK during PHICH repetition #1 and #3, while a cooperating eNB could transmit its ACK/NACK on PHICH repetition #2.

In a further embodiment, each eNB only transmits its ACK if the UL transmission is received correctly or if an immediate non-adaptive retransmission is not required. A NACK is not sent. The UE retransmits if it does not detect an ACK. In this case, if both eNBs received the data correctly, a macro-diversity combining gain is obtained for the ACK.

As will be appreciated, the alternative embodiments above could be utilized with the embodiment of FIG. 12. Specifically, in the embodiment in which separate PHICH space is reserved for each eNB, the procedure of FIG. 12 could be used as provided above.

Further, the embodiment in which the eNB transmits its ACK/NACK during different repetitions of the different PHICH channel could also utilize the procedure of FIG. 12 above.

Figure 13:
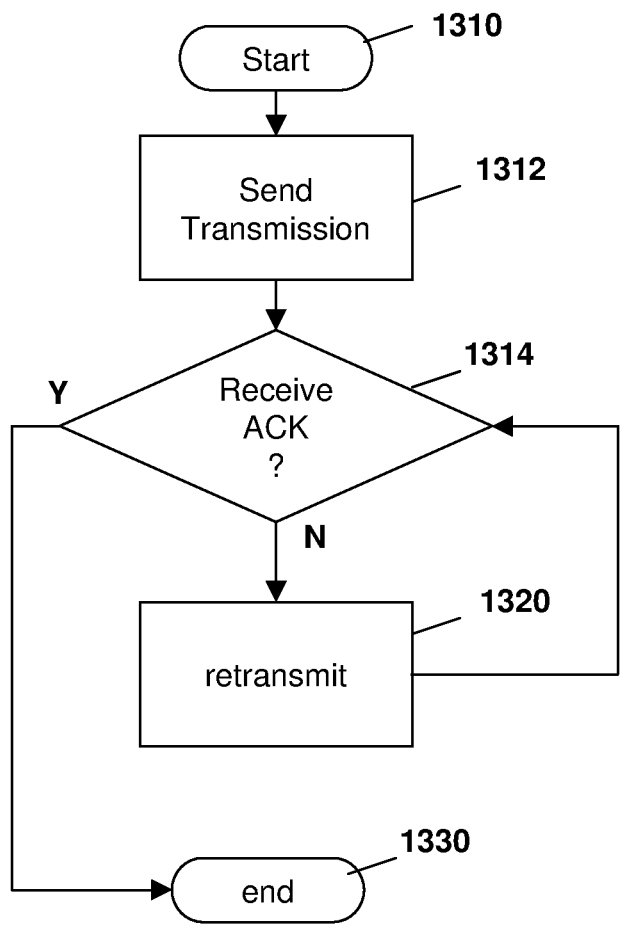
FIG. 13 is a flow diagram of a further procedure on a UE for decoding HARQ responses.

Referring to FIG. 13, the embodiment where the eNBs only transmit ACKs if the UL transmission is received correctly or an immediate non-adaptive retransmission is not required is described. Specifically, the procedure of FIG. 13 starts at block 1310 and proceeds to block 1312 in which the transmission is sent from the UE to the eNBs.

The UE then checks, in block 1314, whether an ACK is received. As will be appreciated, the options are that no ACK is received, one ACK is received or two ACKs are received. In the case of two ACKs being received, a macro-diversity combining gain is obtained for the ACK.

If no ACK is received, the procedure proceeds to block 1320 and the retransmission is initiated at the UE. The procedure proceeds back to block 1314 to check whether an ACK is received for the retransmission.

From block 1314, if an ACK is received, the procedure proceeds to block 1330 and ends.

For each of the above embodiments, the UE can send a termination indicator on the PUCCH to terminate the HARQ transmissions. This is shown below with regard to FIG. 14. The termination indicator provides an over-the-air solution to indicate that backhaul communication is not necessary for conveying the ACK/NACK status, thereby allowing slightly more compact timing.

Figure 14:
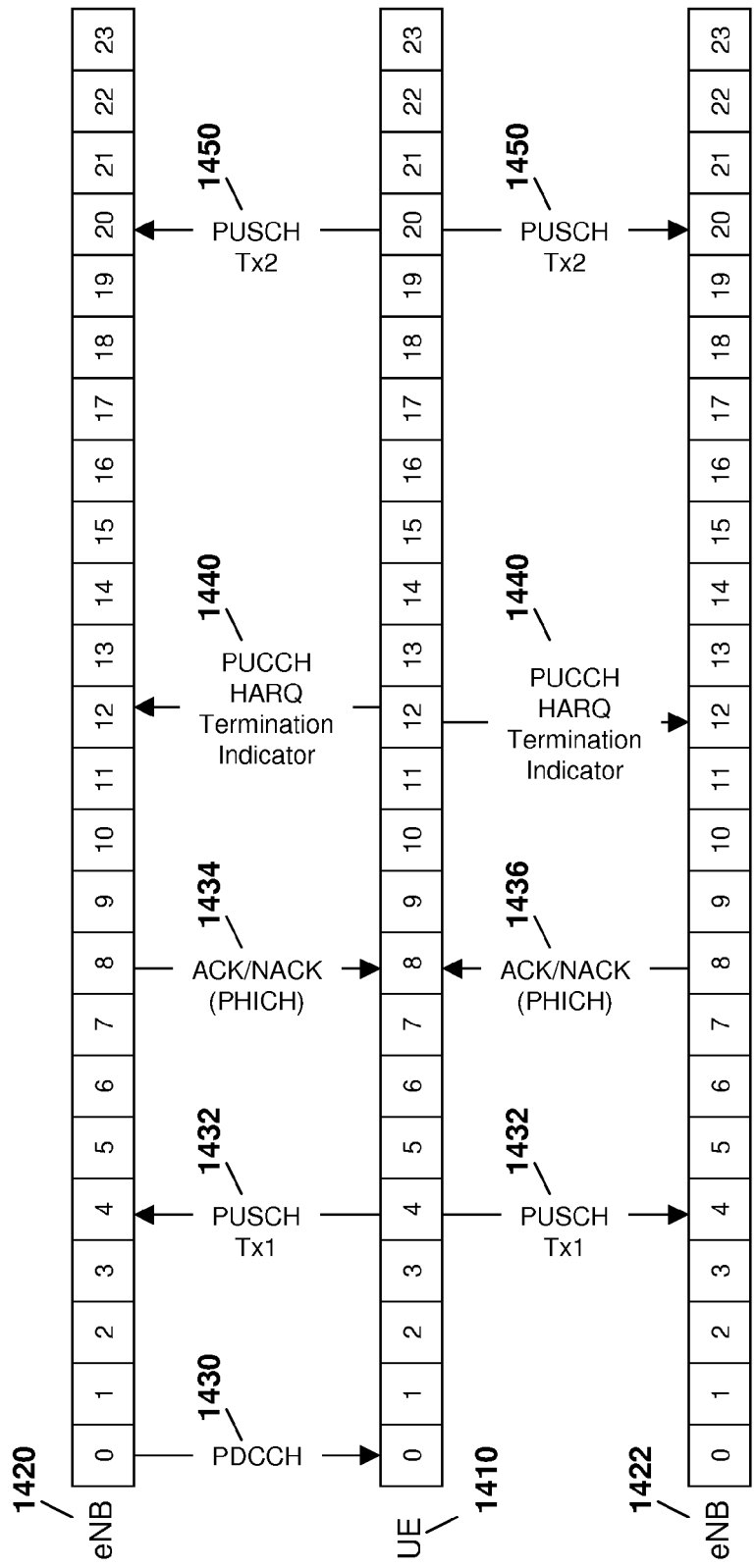
FIG. 14 is a timing diagram illustrating HARQ timing for UL CoMP utilizing a termination indicator.

Referring to FIG. 14, UE 1410 communicates with serving eNB 1420 and cooperating eNB 1422. In subframe 0, serving eNB 1420 transmits the PDCCH (control). This is shown by message 1430.

In subframe 4, the UE transmits an HARQ transmission 1 via the PUSCH, as shown by messages 1432. Both the serving eNB 1420 and cooperating eNB 1422 receive the HARQ transmission 1 and attempt to decode it.

At subframe 8, both the serving eNB 1420 and cooperating eNB 1422 transmit an ACK/NACK status to the UE. This is shown by messages 1434 and 1436.

At subframe 12, UE 1410 transmits an HARQ termination indicator 1440 to serving eNB 1420, cooperating eNB 1422, or both.

As will be appreciated by those skilled in the art, subframe 12 is used as an example, and it may be possible to transmit the HARQ termination indicator 1440 in subframe 10 or 11, depending on exact timing requirements.

In one embodiment, HARQ termination indicator 1440 is set to 1 if the UE received an ACK from either serving eNB

1420 or cooperating eNB 1422. The HARQ termination indicator 1440 is set to 0 if no ACKs were received.

Between subframe 12 and subframe 16, the serving eNB 1420 and cooperating eNB 1422 communicate new scheduling information via the backhaul link. If either eNB does not need to adapt or modify the transmission resource, then nothing needs to be transmitted in subframe 16 and the UE transmits HARQ transmission 2, as shown by message 1450, based on the ACK/NACK information received in subframe 8.

As will be appreciated, if either eNB 1420 or eNB 1422 needs to adapt the transmission resource, the eNB 1420 or eNB 1422 can send a new DCI message in subframe 16. (not shown in FIG. 14.)

The above embodiments with regard to FIGS. 12, 13 and 14 do not rely on backhaul communication to convey ACK/NACK status, which facilitates consistent timing.

In a further embodiment, if the UE determines that both eNBs sent a NACK, then the UE does not need to transmit the HARQ termination indicator.

Figure 15:
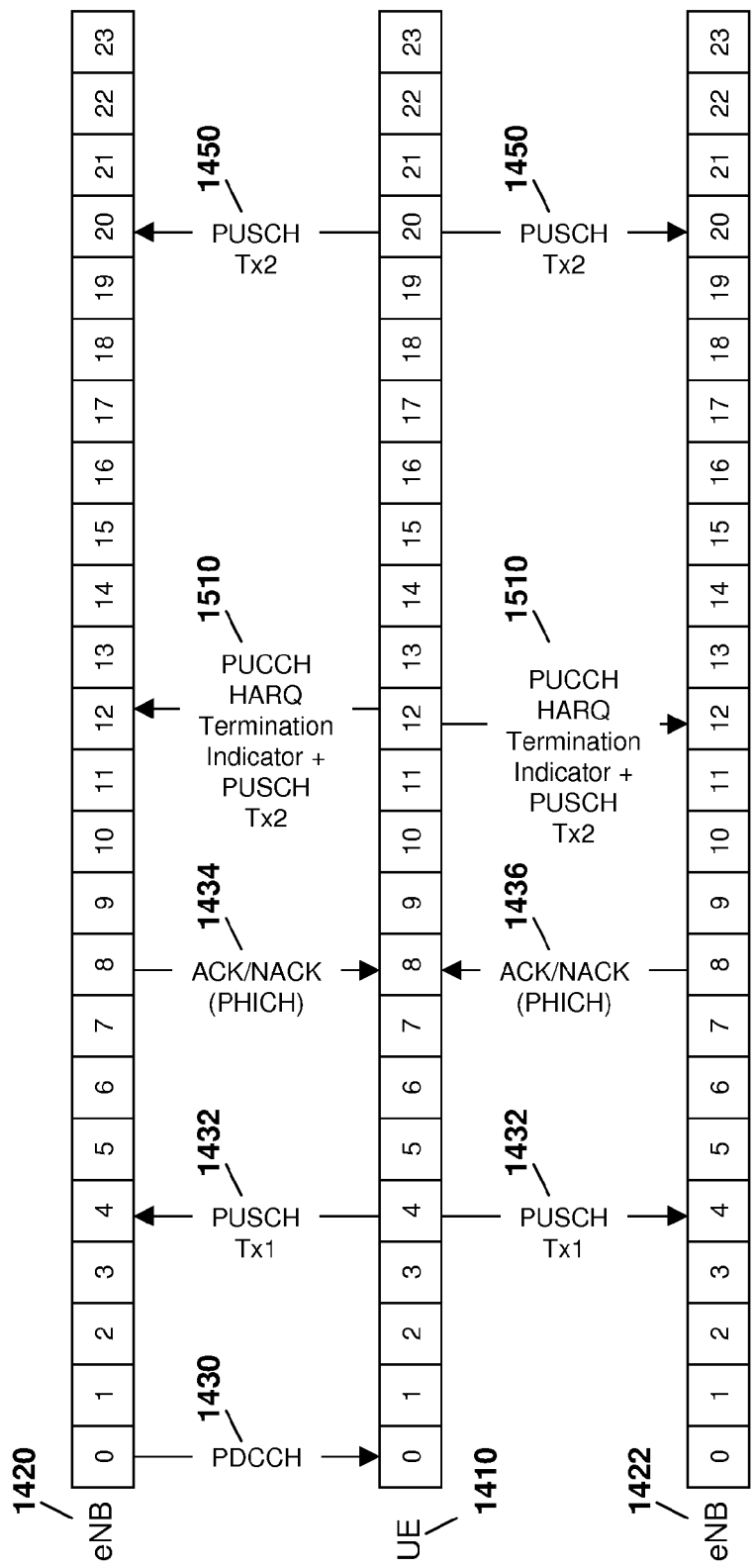
FIG. 15 is a timing diagram illustrating HARQ timing for UL CoMP utilizing a termination indicator or retransmission.

Reference is now made to FIG. 15. In FIG. 15, the UE transmits the second HARQ transmission in subframe 12, as shown by message 1510 of FIG. 15. The remaining numbering is similar to FIG. 14 above.

For message 1510 in subframe 12, the UE retransmits the second HARQ transmission as well as the termination indication if no eNB transmitted an ACK. If, on the other hand, the UE determines that at least one eNB sent an ACK, then the UE transmits only the HARQ termination indicator in subframe 12. In some embodiments, in subframe 12, the UE transmits only the second HARQ transmission if no eNB transmitted an ACK.

From the perspective of an eNB, if the eNB sends an ACK, it only listens for the HARQ transmission indicator since it already has the correctly decoded data. If the eNB sends a NACK, it listens for the HARQ termination indicator to determine if another eNB may have received the packet correctly. If no HARQ termination indicator is detected at the eNB, the eNB decodes the retransmission.

Further, from each eNB perspective, if the eNB transmits an ACK, it knows that it can reuse the resource at subframe 12 for another UE, since it knows the UE will not retransmit 8 milliseconds after the original transmission. If the eNB transmits a NACK, there is a possibility that the other eNB sent an ACK/NACK, in which case the UE may or may not transmit PUSCH for transmission 2. In this case, the eNB that sent the NACK can choose to schedule this resource for another UE, possibly using a different reference signal as in a virtual Multiple Input Multiple Output (MIMO), or can choose to be conservative and let the resource remain unused in case the other eNB sent an ACK, causing less interference to the neighboring cells.

For the case when the eNB chooses to send another grant for subframe 12, the eNB can still check for HARQ termination indicators to determine what happened at the other eNB, thereby allowing the eNB to intelligently decode the PUSCH at subframe 12.

The indexing for PUCCH HARQ termination indicators may need to be defined. The indexing can use the same mapping as Rel-8 based on PDCCH Control Channel Element (CCE) location, and can be located in a different region. In another approach, similar to Semi-Persistent Scheduling (SPS) or HARQ-ACK repetition in LTE Rel-8, the eNB could explicitly assign the required PUCCH resource with Radio Resource Control (RRC) signaling or physical layer signaling. Also, there may be a way to combine the HARQ transmission indicator with the PUSCH transmission.

As will be appreciated, the above provides LTE Rel-8 HARQ timing, which reduces HARQ round trip time. Further, the solution maintains the existing (Rel-8) HARQ process structure.

CoMP for Initial Transmission and non-CoMP for Retransmissions

In further solutions, CoMP may be used for initial HARQ transmissions and non-CoMP used for other transmissions (e.g. retransmissions).

In a first embodiment, CoMP is used for new data transmissions such as those defined by an SPS grant or by a DCI 0 and toggled with a New Data Indicator (NDI) flag. Retransmissions are handled only by the serving eNB.

The use of CoMP for only new data transmissions allows for timing to be slightly improved compared to the all CoMP scenarios.

Figure 16:
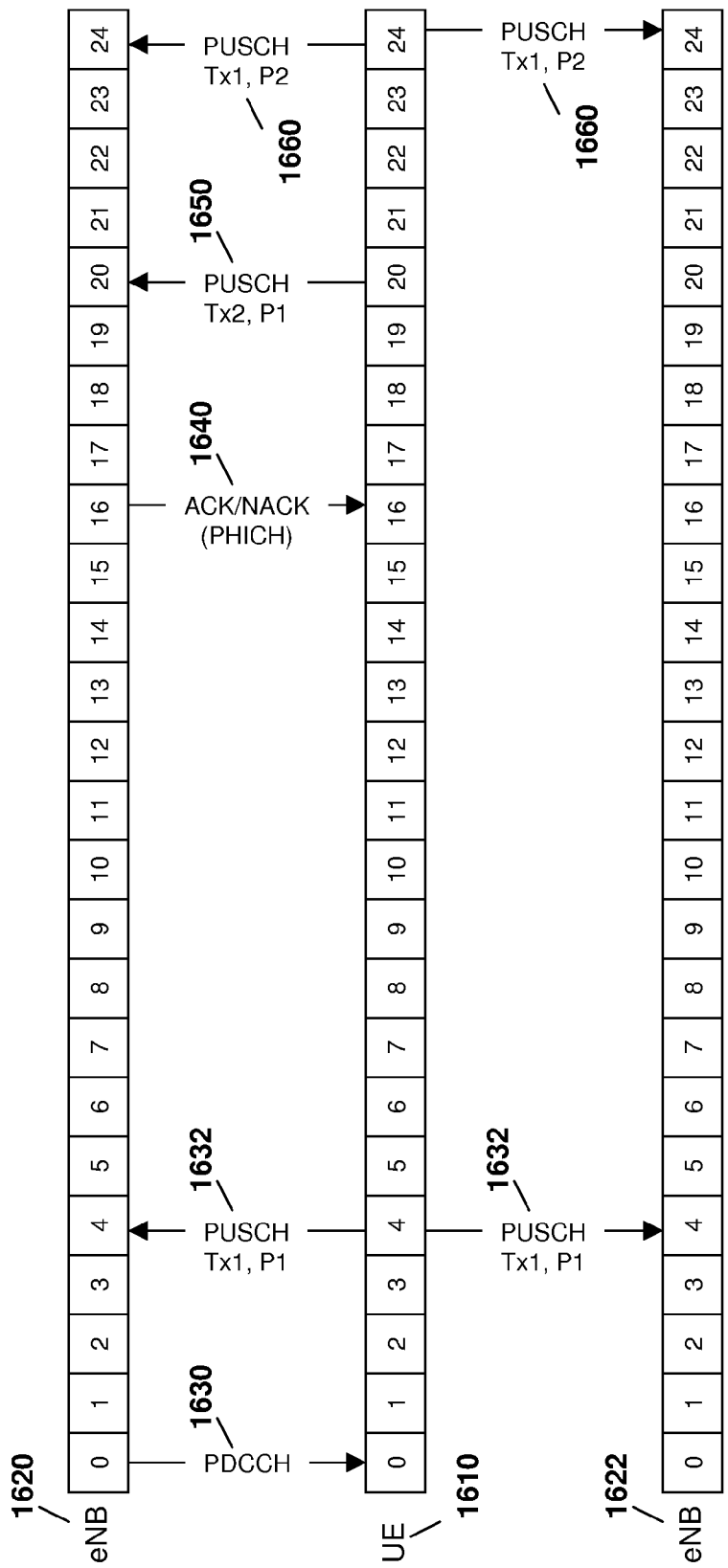
FIG. 16 is a timing diagram illustrating HARQ timing for UL CoMP in which retransmissions are sent only to one network element.

Reference is now made to FIG. 16. In FIG. 16, UE 1610 communicates with a serving eNB 1620 and a cooperating eNB 1622. In subframe 0, serving eNB 1610 transmits the PDCCH (control) for SPS grant, shown by arrow 1630.

In subframe 4, the UE transmits HARQ transmission 1, packet 1, as shown by message 1632, via the PUSCH. Both the serving eNB 1620 and cooperating eNB 1622 receive HARQ transmission 1 and attempt to decode it.

Between subframe 4 and subframe 16, where the position of subframe 16 is fixed in one embodiment, serving eNB 1620 and cooperating eNB 1622 communicate the ACK/NACK status via the backhaul link, and an ACK/NACK is communicated by PHICH to UE 1610, shown by message 1640.

As will be appreciated, there is no need, in the example above, to communicate scheduling information for HARQ transmission 2 to cooperating eNB 1622, since transmission 2 is only received at the serving eNB 1620, as shown by message 1650. If UE 1610 receives a NACK as part of message 1640 in subframe 16 then the UE submits an HARQ retransmission, as shown by 1650, of packet 1 in subframe 20.

In subframe 24, the UE transmits HARQ transmission 1 of packet 2 via the PUSCH to both the serving eNB 1620 and cooperating eNB 1622, as shown by arrow 1660. Thus, based on the above, the retransmission only occurs to serving eNB 1620.

In some embodiments, the eNB and the UE may negotiate the number of HARQ transmissions which will be used for CoMP reception. For example, using high layer signaling such as the RRC signaling the eNB and UE could negotiate whether the CoMP scheme will be used for a specific number of HARQ transmissions, a specific set of redundancy versions and the like.

HARQ Termination Indicator

In a further embodiment, CoMP may be used for a new data transmission (for those defined by an SPS grant) and retransmissions are handled by the serving eNB. In addition, the UE can transmit an HARQ termination indicator to the serving eNB.

Figure 17:
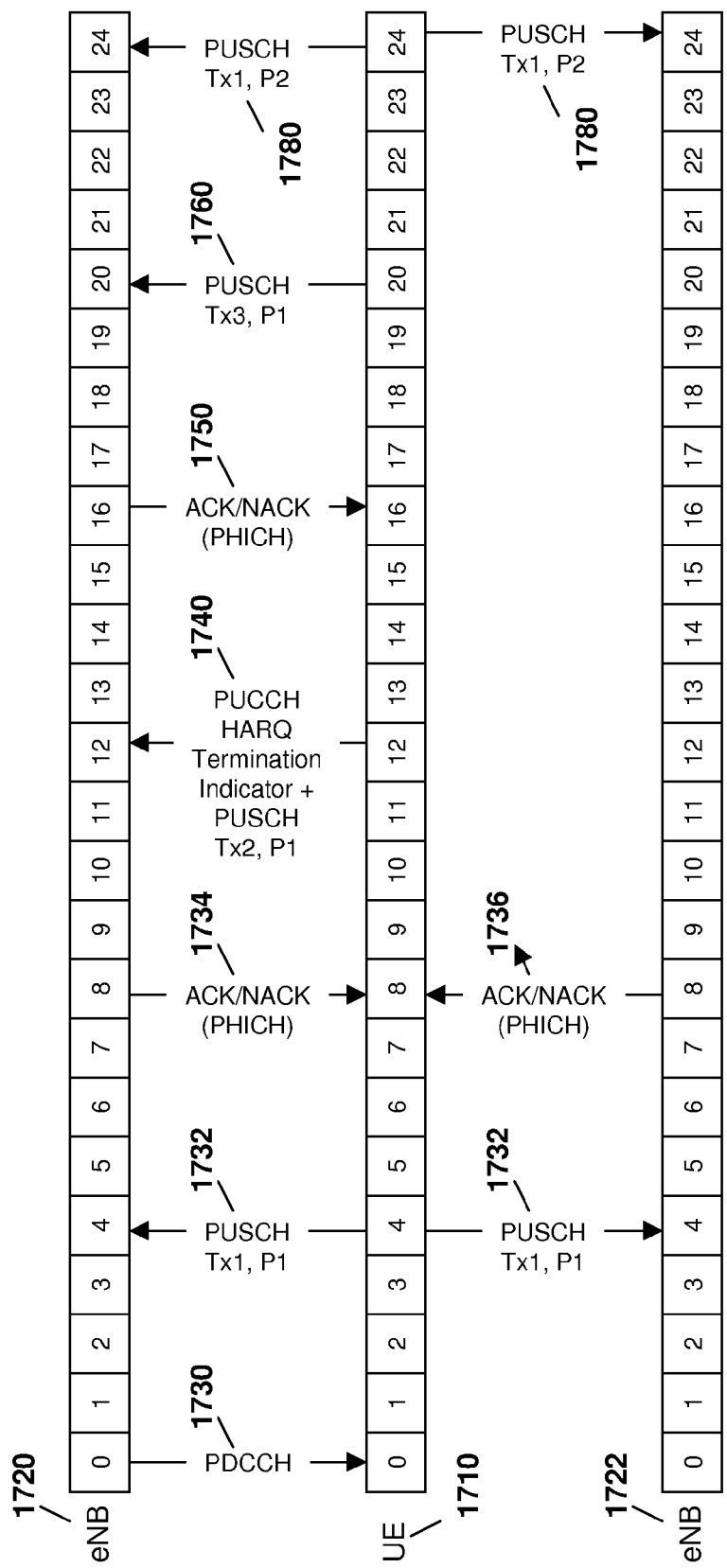
FIG. 17 is a timing diagram illustrating HARQ timing for UL CoMP in which retransmissions are sent only to one network element and utilize a termination indicator.

Reference is now made to FIG. 17 in which UE 1710 communicates with eNB 1720 and cooperating eNB 1722.

In subframe 0, the serving eNB 1720 transmits the PDCCH (control), as shown by message 1730. This example activates an SPS grant with a period of 20 ms (i.e. new data is transmitted every 20 ms).

In subframe 4, the UE transmits HARQ transmission 1 of packet 1 via the PUSCH, as shown by messages 1732.

Both the serving eNB 1720 and cooperating eNB 1722 receive the HARQ transmission 1 and attempt to decode it.

At subframe 8, both eNB 1 and eNB 2 transmit an ACK/NACK status to UE 1710, shown by messages 1734 and 1736.

At subframe 12, if the UE determines that the packet has been successfully decoded, it transmits an HARQ termination indicator to the serving eNB 1720. This is shown by message 1740. Otherwise, the UE transmits HARQ transmission 2 of packet 1 to serving eNB 1720 via the PUSCH.

At subframe 16, serving eNB 1720 transmits an ACK/NACK status to packet 1 to UE 1710, shown by message 1750. If the UE receives a NACK, it transmits HARQ transmission 3 of packet 1 to serving eNB 1720 in subframe 20, as shown by message 1760.

In subframe 24, the UE begins a new data transmission by transmitting HARQ transmission 1 of packet 2 to both serving eNB 1720 and cooperating eNB 1722 via the PUSCH, shown by message 1780.

In a further approach, the UE transmits the initial transmission of the next data packet when the UE receives a NACK from the serving eNB but an ACK from cooperating eNB 1722 with the reserved PUSCH resource because the serving eNB 1720 should reserve the resource for the UE 1710. If the serving eNB 1720 detects both the HARQ termination indicator and a signal in the PUSCH resource, the eNB 1720 may assume that the PUSCH data represents a new transmission of the next data packet. For example, when the binary phase shift keying (BPSK) symbol is used as the modulation of Termination indicator, the UE 1710 could indicate different cases as follows:

1: The HARQ termination without any data in PUSCH
0: The initial transmission of the next packet data
DTX: The retransmission Alternating Order In a further embodiment, CoMP is used for new data transmissions such as those defined by the SPS grant, and retransmissions are handled by both a serving eNB and a cooperating eNB in alternating order. In addition, the UE transmits an HARQ termination indicator to the serving eNB, the cooperating eNB or both.

Figure 18:
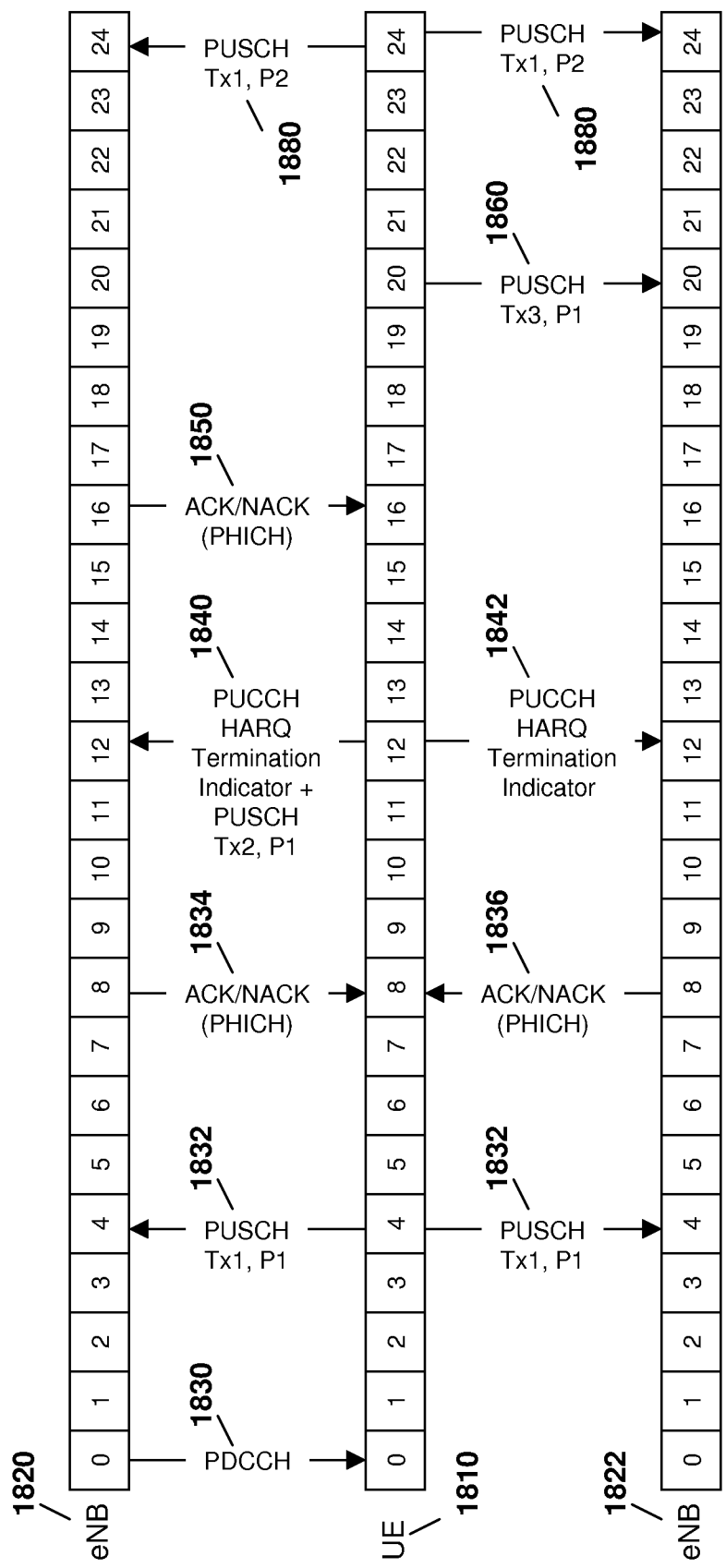
FIG. 18 is a timing diagram illustrating HARQ timing for UL CoMP in which retransmissions are sent to alternating network elements.

Reference is now made to FIG. 18. In FIG. 18, UE 1810 communicates with serving eNB 1820 and cooperating 1822.

In subframe 0, serving eNB 1820 transmits the PDCCH (control) as shown by message 1830. This activates an SPS grant with a period of 20 ms.

In subframe 4, UE 1810 transmits HARQ transmission 1 of packet 1 via the PUSCH as shown by messages 1832 to both eNB 1820 and eNB 1822.

Both the serving eNB 1820 and cooperating eNB 1822 receive messages 1832 and attempt to decode them. At subframe 8, both serving eNB 1820 and cooperating eNB 1822 transmit the ACK/NACK status to UE 1810, as shown by messages 1834 and 1836 respectively.

At subframe 12, if UE 1810 determines that the packet has been successfully decoded, it transmits an HARQ termination indicator to both the serving eNB 1820 and cooperating eNB 1822, as shown by messages 1840 and 1842 respectively.

Otherwise, UE 1810 transmits HARQ transmission 2 of packet 1 to serving eNB 1820 via the PUSCH as message 1840.

At subframe 16, serving eNB 1820 transmits an ACK/NACK status for packet 1 to UE 1810, shown by message 1850. If UE 1810 receives a NACK, it transmits HARQ transmission 3 of packet 1 to cooperating eNB 1822 in subframe 20, as shown by message 1860.

In subframe 24, the UE transmits HARQ transmission 1 of packet 2 to both serving eNB 1820 and cooperating eNB 1822 via the PUSCH, shown by messages 1880.

A benefit of transmitting to alternating eNBs is that both eNBs participate in the reception of transmission and coordination of scheduling is not required apart from the initial transmission.

Forwarding Packet Decision Information for CoMP Transmission

In the solutions described above, attempts to decode the packet are made at both eNBs involved in CoMP reception on the UL. If decoding is unsuccessful, the eNB can retain the packet information for combining with future HARQ retransmissions according to HARQ processes.

In addition, non-serving eNBs for a given UE may also forward decision information to the serving eNB. Forwarded information may include soft or hard bit decisions, figures of merits for packets, symbols or bits, or other formats of quantized decision data.

The packet decision information from other eNBs may arrive at the serving eNBs at irregular intervals which may lead to correct packet decisions at any time in the HARQ procedure.

Thus, in one embodiment, it may be useful to allow the serving eNB to transmit an ACK/NACK response at every feedback opportunity. As will be appreciated, this may be useful even if the serving eNB does not handle over-the-air reception of the most recent UE transmission.

Virtual Cells

In U.S. patent application Ser. No. 12/537,867, entitled "System and Method for a Virtual Carrier for a Multi-Carrier and Coordinated Multi-Point Network Operation", the contents of which are incorporated herein by reference, the concept of a virtual carrier and a virtual cell is introduced. A virtual carrier is a carrier that is advertised as existing in one eNB, but is actually transmitted or received by other eNBs. This allows a deployment to efficiently use resources.

Virtual cells can be created when different nodes and virtual carriers are used for UL and DL transmissions. For example, an UE can transmit on the UL to its serving node. The serving node can schedule the UE for DL transmissions on a cooperating node's carrier, which is a virtual carrier for the serving node. This example is illustrated with regard to FIG. 19 below.

Figure 19:
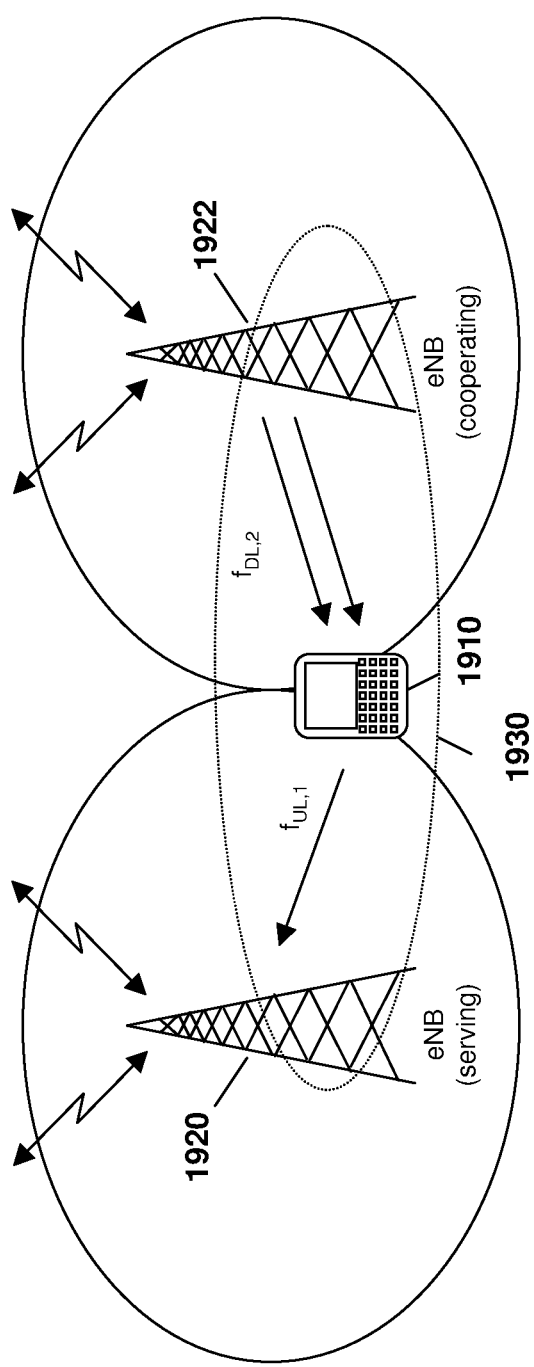
FIG. 19 is a block diagram showing an exemplary coordinated multi-point communication for a virtual cell.

Reference is made to FIG. 19. In FIG. 19, UE 1910 communicates with a serving eNB 1920 and a cooperating eNB 1922. A virtual cell 1930 is created for the two eNBs.

For UL HARQ in a virtual cell 1930, the same problem as outlined above with regard to embodiments of FIGS. 1 to 18 exists. In particular, serving eNB 1920 is decoding UL transmissions and cooperating eNB 1922 is controlling the UE via PUCCH and PHICH for ACK/NACK. Therefore, the serving eNB 1920 must transmit ACK/NACK status of packets to cooperating eNB 1922 via backhaul. The operation is similar to a CoMP operation and therefore the solutions outlined above can be equally applied to the case of a virtual cell.

The above can be implemented on any user equipment and any network element such as an evolved Node B.

Figure 20:
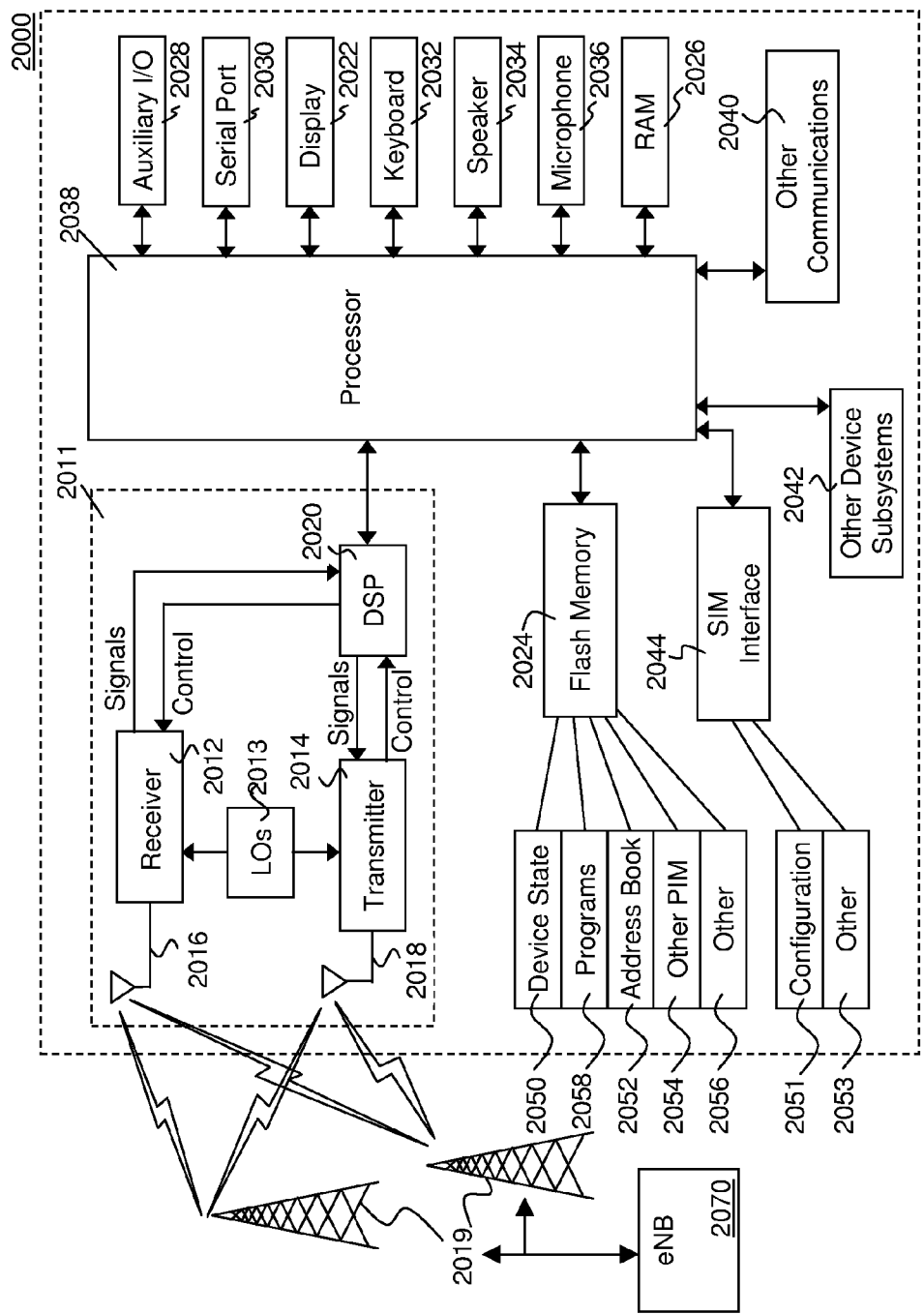
FIG. 20 is a block diagram of an exemplary user equipment.

FIG. 20 is a block diagram illustrating a UE capable of being used with embodiments of the apparatus and method of the present application. UE 2000 is generally a two-way wireless communication device having voice or data communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 2000 is enabled for two-way communication, it will incorporate a communication subsystem 2011, including both a receiver 2012 and a transmitter 2014, as well as associated components such as one or more, embedded or internal, antenna elements 2016 and 2018, local oscillators (LOs) 2013, and a processing module such as a digital signal processor (DSP) 2020. As will be apparent to those skilled in the field of communications, the particular design of the communication subsystem 2011 will be dependent upon the communication network in which the device is intended to operate.

Network access requirements will also vary depending upon the type of network 2019. An LTE UE may require a subscriber identity module (SIM) card in order to operate on the LTE or LTE-A network. The SIM interface 2044 is normally similar to a card-slot into which a SIM card can be inserted and ejected like a diskette or PCMCIA card. The SIM card may hold key configuration 2051, and other information 2053 such as identification, and subscriber related information.

When network registration or activation procedures have been completed, UE 2000 may send and receive communication signals over the network 2019. As illustrated in FIG. 20, network 2019 can consist of multiple antennas communicating with the UE. These antennas are in turn connected to an eNB 2070.

Signals received by antenna 2016 through communication network 2019 are input to receiver 2012, which may perform such common receiver functions as signal amplification, frequency down conversion, filtering, channel selection and the like, and in the example system shown in FIG. 20, analog to digital (A/D) conversion. A/D conversion of a received signal allows more complex communication functions such as demodulation and decoding to be performed in the DSP 2020. In a similar manner, signals to be transmitted are processed, including modulation and encoding for example, by DSP 2020 and input to transmitter 2014 for digital to analog conversion, frequency up conversion, filtering, amplification and transmission over the communication network 2019 via antenna 2018. DSP 2020 not only processes communication signals, but also provides for receiver and transmitter control. For example, the gains applied to communication signals in receiver 2012 and transmitter 2014 may be adaptively controlled through automatic gain control algorithms implemented in DSP 2020.

UE 2000 typically includes a processor 2038 which controls the overall operation of the device. Communication functions, including data and voice communications, are performed through communication subsystem 2011. Processor 2038 also interacts with further device subsystems such as the display 2022, flash memory 2024, random access memory (RAM) 2026, auxiliary input/output (I/O) subsystems 2028, serial port 2030, one or more keyboards or keypads 2032, speaker 2034, microphone 2036, other communication subsystem 2040 such as a short-range communications subsystem and any other device subsystems generally designated as 2042. Serial port 2030 could include a USB port or other port known to those in the art.

Some of the subsystems shown in FIG. 20 perform communication-related functions, whereas other subsystems may provide "resident" or on-device functions. Notably, some subsystems, such as keyboard 2032 and display 2022, for example, may be used for both communication-related functions, such as entering a text message for transmission over a communication network, and device-resident functions such as a calculator or task list.

Operating system software used by the Processor 2038 is generally stored in a persistent store such as flash memory 2024, which may instead be a read-only memory (ROM) or similar storage element (not shown). Those skilled in the art will appreciate that the operating system, specific device applications, or parts thereof, may be temporarily loaded into a volatile memory such as RAM 2026. Received communication signals may also be stored in RAM 2026.

As shown, flash memory 2024 can be segregated into different areas for both computer programs 2058 and program data storage 2050, 2052, 2054 and 2056. These different storage types indicate that each program can allocate a portion of flash memory 2024 for their own data storage requirements. Processor 2038, in addition to its operating system functions, may enable execution of software applications on the UE. A predetermined set of applications that control basic operations, including at least data and voice communication applications for example, will normally be installed on UE 2000 during manufacturing. Other applications could be installed subsequently or dynamically.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application would generally have the ability to send and receive data items, via the wireless network 2019. In one embodiment, the PIM data items are seamlessly integrated, synchronized and updated, via the wireless network 2019, with the UE user's corresponding data items stored or associated with a host computer system. Further applications may also be loaded onto the UE 2000 through the network 2019, an auxiliary I/O subsystem 2028, serial port 2030, short-range communications subsystem 2040 or any other suitable subsystem 2042, and installed by a user in the RAM 2026 or a non-volatile store (not shown) for execution by the microprocessor 2038. Such flexibility in application installation increases the functionality of the device and may provide enhanced on-device functions, communication-related functions, or both. For example, secure communication applications may enable electronic commerce functions and other such financial transactions to be performed using the UE 2000.

In a data communication mode, a received signal such as a text message or web page download will be processed by the communication subsystem 2011 and input to the microprocessor 2038, which preferably further processes the received signal for element attributes for output to the display 2022, or alternatively to an auxiliary I/O device 2028.

A user of UE 2000 may also compose data items such as email messages for example, using the keyboard 2032, which may be a complete alphanumeric keyboard or telephone-type keypad, in conjunction with the display 2022 and possibly an auxiliary I/O device 2028. Such composed items may then be transmitted over a communication network through the communication subsystem 2011.

For voice communications, overall operation of UE 2000 is similar, except that received signals would preferably be output to a speaker 2034 and signals for transmission would be generated by a microphone 2036. Alternative voice or audio I/O subsystems, such as a voice message recording subsystem, may also be implemented on UE 2000. Although voice or audio signal output is preferably accomplished primarily through the speaker 2034, display 2022 may also be used to provide an indication of the identity of a calling party, the duration of a voice call, or other voice call related information for example.

Serial port 2030 in FIG. 20 would normally be implemented in a personal digital assistant (PDA)-type UE for which synchronization with a user's desktop computer (not shown) may be desirable, but is an optional device component. Such a port 2030 would enable a user to set preferences through an external device or software application and would extend the capabilities of UE 2000 by providing for information or software downloads to UE 2000 other than through a wireless communication network. The alternate download path may for example be used to load an encryption key onto the device through a direct and thus reliable and trusted connection to thereby enable secure device communication. As will be appreciated by those skilled in the art, serial port 2030 can further be used to connect the UE to a computer to act as a modem.

Other communications subsystems 2040, such as a short-range communications subsystem, is a further component which may provide for communication between UE 2000 and different systems or devices, which need not necessarily be similar devices. For example, the subsystem 2040 may include an infrared device and associated circuits and components or a Bluetooth™ communication module to provide for communication with similarly enabled systems and devices. Subsystem 2040 may also be used for WiFi or WiMAX communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for hybrid automatic repeat request operation for uplink coordinated multi-point signaling comprising:
   receiving, at a user equipment, information indicating a time interval;
   sending, by a user equipment, a data packet to a plurality of network elements;
   waiting, by the user equipment, a time period corresponding to the time interval for a control indication from at least one of the plurality of network element, wherein the time period is sufficient to allow the plurality of network elements to communicate over a backhaul link, considering the load of the backhaul link; and
   retransmitting, by the user equipment, the data packet to the plurality of network elements if the control indication specifies retransmission is required.

2. The method of claim 1, wherein the control indication is received on a physical downlink control channel.

3. The method of claim 1, wherein the sending further comprises adding a hybrid automatic repeat request process indicator to a control indication.

4. A user equipment configured for hybrid automatic repeat request operation for uplink coordinated multi-point signaling comprising:
   a processor; and
   a communications subsystem,
   wherein the user equipment is configured to:
      receive information indicating a time interval;
      send a data packet using the communications subsystem to a plurality of network elements;
      wait a time period corresponding to the time interval for a control indication from at least one of the plurality of network element, wherein the time period is sufficient to allow the plurality of network elements to communicate over a backhaul link, considering the load of the backhaul link; and
      retransmit the data packet to the plurality of network elements if the control indication specifies retransmission is required.

5. A method for hybrid automatic repeat request operation for uplink coordinated multi-point signaling comprising:
   checking, at a user equipment, whether a HARQ timing has been adjusted;
   sending, by the user equipment, a data packet to a plurality of network elements;
   if the HARQ timing has not been adjusted, receiving, by the user equipment, after a predefined interval, an acknowledgement or negative acknowledgement from at least one of the plurality of network elements;
   if the HARQ timing has been adjusted, receiving, by the user equipment, after the adjusted HARQ timing, an acknowledgement or negative acknowledgement from at least one of the plurality of network elements; and
   retransmitting, by the user equipment, the data packet to the plurality of network elements if the a negative acknowledgement is received.

6. The method of claim 5, wherein the predefined interval is configurable through signaling between the user equipment and network element.

7. The method of claim 5, wherein the predefined interval is selected to allow the plurality of network elements to communicate over a backhaul link.

8. The method of claim 5, wherein the acknowledgment or negative acknowledgement is received over a physical hybrid automatic repeat request indicator channel.

9. The method of claim 8, wherein the physical hybrid automatic repeat request indicator channel provides a region for user equipments utilizing uplink coordinated multi-point signaling.

10. The method of claim 5, wherein the predefined interval is selected to be an integer multiple of Long Term Evolution Release 8 hybrid automatic repeat request timing.

11. A user equipment configured for hybrid automatic repeat request operation for uplink coordinated multi-point signaling, the user equipment comprising:
   a processor; and
   a communications subsystem,
   wherein the user equipment is configured to:
      check whether a HARQ timing has been adjusted;
      send a data packet from a user equipment to a plurality of network elements;
      if the HARQ timing has not been adjusted, receive, after a predefined interval, an acknowledgement or negative acknowledgement from at least one of the plurality of network elements;
      if the HARQ timing has been adjusted, receive, after the adjusted HARQ timing, an acknowledgement or negative acknowledgement from at least one of the plurality of network elements; and
      retransmit the data packet to the plurality of network elements if a negative acknowledgement is received.

12. A method for hybrid automatic repeat request operation for uplink coordinated multi-point signaling comprising:
   extending, by a user equipment, the periodicity of a hybrid automatic repeat request process by an integer multiple;
   increasing, by the user equipment, the number of uplink transmission attempts based on a value provided by at least one of a plurality of network elements; and sending, by the user equipment, a data packet to the plurality of network elements utilizing the extended periodicity of the hybrid automatic repeat request process.

13. A method for hybrid automatic repeat request operation, comprising:
    sending, by a user equipment, a data packet to a plurality of network elements in a communications network supporting uplink coordinated multi-point signaling;
    receiving, by the user equipment, a hybrid automatic repeat request response from at least a serving network element and a cooperating network element;
    decoding, by the user equipment, the hybrid automatic repeat request response from the serving network element;
    decoding, by the user equipment, the hybrid automatic repeat request response from the cooperating network element if the hybrid automatic repeat request response from a serving network element is not an acknowledgment; and
    retransmitting, by the user equipment, the data packet if the hybrid automatic repeat request response from a cooperating network element is not an acknowledgement.

14. The method of claim 13, wherein the decoding of the hybrid automatic repeat request response from a serving network element or cooperating network element utilizes a physical hybrid automatic repeat request indication channel.

15. The method of claim 13, wherein the decoding of the hybrid automatic repeat request response from a serving network element or cooperating network element utilizes a physical hybrid automatic repeat request indication channel within a control channel region.

16. The method of claim 13, wherein the decoding of the hybrid automatic repeat request response from a serving network element or cooperating network element utilizes a downlink coordinated multi-point signaling region having a separate physical hybrid automatic repeat request indication channel space for each network element.

17. The method of claim 13, further comprising sending, by the user equipment, a termination indicator to signal that a backhaul communication is not required between the serving network element and cooperating network element.

18. The method of claim 17, further comprising sending, by the user equipment, a second hybrid automatic repeat request transmission instead of a termination indicator if the decoding of the hybrid automatic repeat request response from a serving network element and cooperating network element both result in negative acknowledgements.

19. The method of claim 13, wherein the receiving only receives a positive acknowledgement.

20. A method for hybrid automatic repeat request operation for uplink coordinated multi-point signaling comprising:
    sending, by a user equipment, a data packet to a plurality of network elements;
    receiving, by the user equipment, a hybrid automatic repeat request response from each of a plurality of network elements;
    if the hybrid automatic repeat request response from each of the plurality of network elements is a negative acknowledgment, retransmitting, by the user equipment, the data packet to only one network element;
    after the retransmission, receiving, by the user equipment, a hybrid automatic repeat request response from the only one network element;
    retransmitting, by the user equipment, a further data packet to one of: the only one network element and a different network element than the only one network element if the hybrid automatic repeat request response from the only one network element is a negative acknowledgement; and
    sending, by the user equipment, a termination indicator if a positive acknowledgement is received.

21. A method for hybrid automatic repeat request operation for uplink coordinated multi-point signaling comprising:
    sending, by a user equipment, a data packet to a plurality of network elements;
    receiving, by the user equipment, a hybrid automatic repeat request response from each of a plurality of network elements; and
    if the hybrid automatic repeat request response from each of the plurality of network elements is a negative acknowledgment:
        retransmitting, by the user equipment, the data packet to only one network element;
        receiving, by the user equipment, a hybrid automatic repeat request response from the only one network element; and
        if the hybrid automatic repeat request response from the only one network element is a negative acknowledgement, retransmitting, by the user equipment, a further data packet to a different network element than the only one network element.

* * * * *